United States Patent
Edwards et al.

(10) Patent No.: US 7,761,871 B2
(45) Date of Patent: Jul. 20, 2010

(54) DATA ACCESS ARCHITECTURE

(75) Inventors: James D. Edwards, Kansas City, MO (US); Timothy B. Massay, Olathe, KS (US); Cassidy L. Lackey, Southlake, TX (US); Steve N. McGuigan, Los Altos, CA (US); Ronald D. Patton, Gainesville, FL (US); Robert West, Broken Arrow, OK (US); Benjamin Gottlieb, Chicago, IL (US); Samuel P. Chipman, Canton, GA (US); Aaron D. Summa, Olathe, KS (US)

(73) Assignee: Handmark, Inc., Kansas City, MO (US)

( * ) Notice: Subject to any disclaimer, the term of this patent is extended or adjusted under 35 U.S.C. 154(b) by 888 days.

(21) Appl. No.: 10/598,629

(22) PCT Filed: Mar. 10, 2005

(86) PCT No.: PCT/US2005/007366

§ 371 (c)(1),
(2), (4) Date: Oct. 20, 2006

(87) PCT Pub. No.: WO2005/088450

PCT Pub. Date: Sep. 22, 2005

(65) Prior Publication Data

US 2007/0214454 A1    Sep. 13, 2007

Related U.S. Application Data

(60) Provisional application No. 60/551,636, filed on Mar. 10, 2004.

(51) Int. Cl.
G06F 9/445 (2006.01)
G06F 15/16 (2006.01)
G06F 7/00 (2006.01)

(52) U.S. Cl. .......... 717/176; 709/203; 707/621

(58) Field of Classification Search ........... 717/106, 717/120, 176; 455/414.3; 710/33; 709/203; 361/679.3; 707/621
See application file for complete search history.

(56) References Cited

U.S. PATENT DOCUMENTS 6,446,111 B1 * 9/2002 Lowery .............. 709/203
6,522,875 B1 * 2/2003 Dowling et al. ...... 455/414.3

(Continued)

OTHER PUBLICATIONS

International Search Report and Written Opinion, dated Jul. 6, 2005, PCT/US05/007366, Data Access Architecture, 8 pages.

(Continued)

Primary Examiner—Wei Y Zhen
Assistant Examiner—Chih-Ching Chow
(74) Attorney, Agent, or Firm—Polsinelli Shughart, PC

(57) ABSTRACT

Methods and apparatuses for remotely accessing data through a wireless device are disclosed. Preferably, the wireless device includes an ability to link data between software components operating on the wireless device. Additionally, the wireless device preferably includes an ability to reduce remote data access by identifying a first data type and a second data type used by a software component, retrieving data corresponding to the first data type from a service provider, retrieving data corresponding to the second data type from the portable device, and displaying on the portable device a return content result including both the first data type and the second data type.

13 Claims, 14 Drawing Sheets

U.S. PATENT DOCUMENTS

| | | | |
|---|---|---|---|
| 6,557,054 B2 * | 4/2003 | Reisman | 710/33 |
| 6,629,284 B1 * | 9/2003 | Leermakers | 714/748 |
| 6,636,885 B1 | 10/2003 | Martin | |
| 6,681,391 B1 | 1/2004 | Marino | |
| 6,810,245 B1 | 10/2004 | Hinds | |
| 2002/0156779 A1 * | 10/2002 | Elliott et al. | 707/6 |
| 2004/0176080 A1 * | 9/2004 | Chakravorty et al. | 455/414.1 |
| 2005/0129385 A1 * | 6/2005 | Speasl et al. | 386/46 |

OTHER PUBLICATIONS

International Preliminary Examination Report, dated Sep. 21, 2006, PCT/US05/007366, Data Access Architecture, 6 pages.

* cited by examiner

Figure 4

| Mapping | Directions |

Lookup Address

Addres _____
City     _____
State    _____
Zip      _____

Map

Figure 4A

| Mapping | Directions |

Origin:
Lookup

Address _____
City    _____
State   _____
Zip     _____

Destination
Lookup

Addres _____
City   _____
State  _____
Zip    _____

Get Directions

Figure 4B

Figure 4 (Continued)
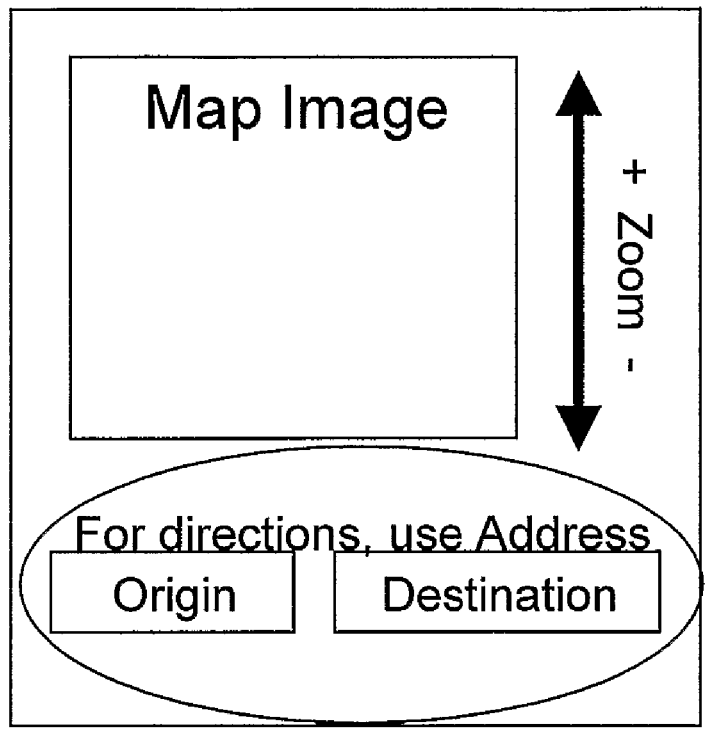
Figure 4C
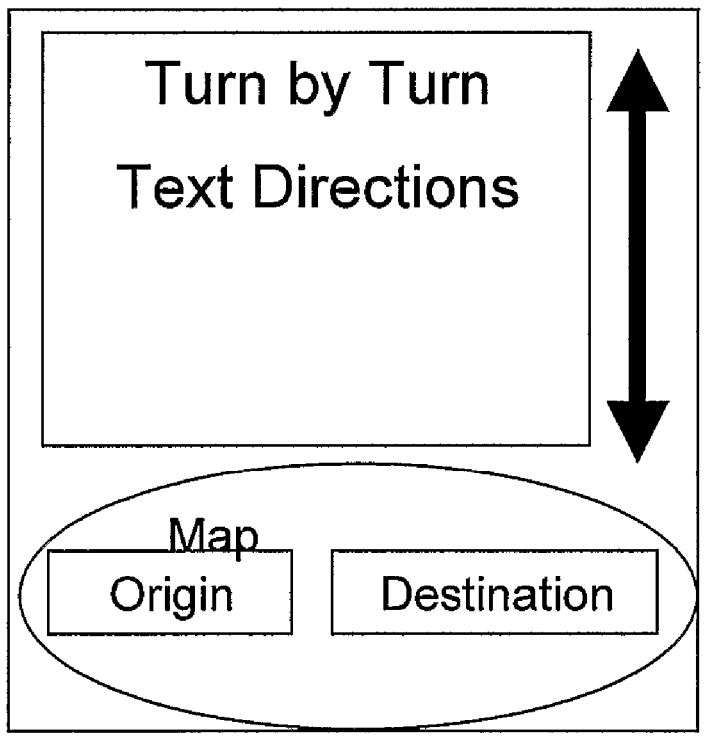
Figure 4D

Handmark
105 E. 5th Street
Kansas City, MO

Use as:

| Map | Origin | Dest |

Mapping | Directions

Addres _____
City _____
State _____
Zip _____

Map Address

Figure 4F

Mapping | Directions

Origin:
Addres _____
City _____
State _____
Zip _____

Destination
Addres _____
City _____
State _____
Zip _____

Get Directions

| Find a Flight |
|---|
| [Flight #] [Airport-Airport] |
| Date: ▼12 / ▼15/ ▼2003 |
| Airline Code: ____ [Lookup] |
| Flight Number: ____ |
| [Done] [Search] |

Figure 6B

| Airline Code |
|---|
| Airline: America |
| [Search] |
| American Airlines |
| America West |
| |
| [OK] |

Figure 6C

| Flights |
|---|
| American Airlines   2345 |
| Thursday, December 11, 2003 |
| Departed ATL from gate 19 at 8:30am. |
| |
| Scheduled to arrive SEA at 2:15pm but estimated to arrive at 2:45pm. Terminal G gate 18, baggage claim 3. |
| |
| Weather advisory may delay flights leaving Atlanta |
| [Done] [Update] |

Figure 6D

| Find a Flight |
|---|
| [Flight #] [Airport-Airport] |
| Date: ▼12 / ▼15/ ▼2003 |
| ▼Departure: ▼6am - 12pm |
| Departure Airport Code: ____ [Lookup] |
| Arrival Airport Code: ____ [Lookup] |
| [Done] [Search] |

Figure 6E

| Airport Code |
|---|
| Aiport Name or City: |
| Dallas |
| [Search] |
| Love Field |
| Dallas - Fort Worth International |
| Meecham Aiport |
| |
| [OK] |

Figure 6F

| Flights |
|---|
| American Airlines   2345 |
| Depart DFW 10:34am |
| Arrive MCI 12:33pm |
| American Airlines   3433 |
| Depart DFW 12:34pm |
| Arrive MCI 1:44pm |
| |
| [Done] |

Figure 6G

| Flight Summary |
|---|
| American Airlines   2345 |
| Thursday, December 11, 2003 |
| |
| Departed ATL at 8:30am. |
| |
| Scheduled to arrive SEA at 2:15pm and estimated to arrive at 2:45pm. |
| |
| [Done] [Update] [Details] |

| Movie Showtimes |
|---|
| Finding Nemo<br>Comedy, Family, G, 1:34m<br>Grapevine Mills 26<br>(2:45 PM),(3:25),(4:55),(5:45),<br>7:00, 8:00, 9:25, 10:10 PM<br>Silverlake 6<br>(3:05 PM), (5:30),7:40,9:55PM<br>Spy Kids 3D: Game Over<br>Action, Drama, PG, 92m<br>Silverlake 6<br>(3:05 PM), (5:30), 7:40, 9:55 |
| (Done) (Update) (New Search) |

Figure 7B

| Movie Details |
|---|
| Spy Kids 3D: Game Over<br>Action, Drama, G for action<br>sequences and peril<br>Cast: Antonio Banderas, Carla<br>Gugino, Alexa Vega, Daryl<br>Sabara, Sylvester Stallone<br>Directed by Robert Rodriguez<br>Released on July 25, 2003<br>Running Time: 89 Minutes<br>Under-age agents Juni and<br>Carmen Cortez set out on their |
| (Done) (Theaters) |

Figure 7C

| Theater Details |
|---|
| Grapevine Mills<br>Spy Kids 3D: Game Over<br>(2:45 PM),(3:25),(4:55),(5:45),<br>7:00, 8:00, 9:25, 10:10 PM<br>$5.50, $3.50, $3.50<br>115 South Sycamore Street<br>Grapevine, TX 76092<br>(423)543-1933<br>Silverlake 6<br>Spy Kids 3D: Game Over<br>(3:05 PM), (5:30),7:40,9:55PM |
| (Done) |

Figure 7D

| Movie Showtimes |
|---|
| Movie: ▼ All Movies<br><br>☑ Include Movie Details<br><br>Theater: ▼ My Theaters |
| (Done) (Search) |

Figure 7E

| Movie Showtimes |
|---|
| Movie: ▼ By Name<br>Name: _____<br>☑ Include Movie Details<br>Theater: ▼ By Location<br>Name: _____<br>City: _____ St: ▼<br>Zip: _____<br>City/State or Zip Required |
| (Done) (Search) |

Figure 7F

| My Theaters |
|---|
| Grapevine Tinsel Town 26<br>1212 N. Main St<br>Grapevine, Tx<br>817-488-3335<br>Grapevine Mills 12<br>100 Grapevine Mills Pkwy<br>Grapevine, TX<br>814-555-6666<br>Southlake Town Square AMC<br>1200 Main St<br>Southlake, TX |
| (Done) (Add Theater) |

Figure 7G

| Add Theater to 'My Theaters' |
|---|
| Theater Name: _____<br><br>City: _____ St: ▼<br><br>Zip: _____<br>City/State or Zip Required |
| (Done) (Search) |

Figure 8
Figure 8A
Figure 8B
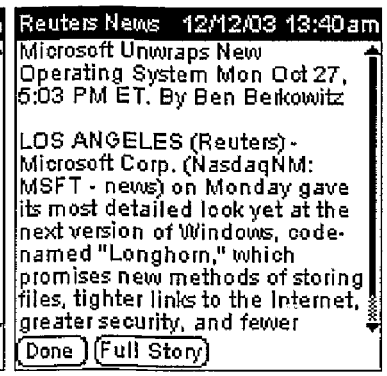
Figure 8C
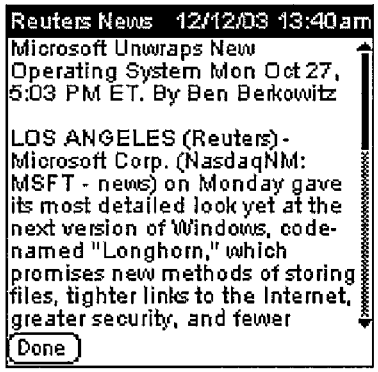
Figure 8D

Figure 9

| White Pages | White Pages | White Pages |
|---|---|---|
| Search: ▼Find a Person | Search: ▼Find a Neighbor | Search: ▼Find a Business |
| First: _____ ▼Begins With | *House #: _____ | *Name: _____ |
| *Last: _____ ▼Exactly | *Street: _____ | |
| House #: _____ | *City: _____ *State: ___ | City: _____ *State: ___ |
| Street: _____ | Zip: _____ | Zip: _____ |
| City: _____ *State: ___ | | |
| (Search) | (Search) | (Search) |
| (Done) *required | (Done) *required | (Done) *required |

Figure 9A  Figure 9B  Figure 9C

| White Pages | White Pages | White Pages |
|---|---|---|
| Search: ▼Reverse Address | Search: ▼Reverse Phone | Lackey, B C<br>Walnut Springs, TX 76690<br>(254) 797-3781 |
| *House #: _____ | | |
| *Street: _____ | *Phone #: _____ | Lackey C<br>1012 Brazos Dr.<br>Southlake, TX 76092 |
| *City: _____ *State: ___ | | |
| Zip: _____ | | Lackey<br>214 E.College St.<br>Grapevine, TX 76092 |
| (Search) | (Search) | |
| (Done) *required | (Done) *required | (Done) |

Figure 9D  Figure 9E  Figure 9F

DATA ACCESS ARCHITECTURE

CORRESPONDING RELATED APPLICATIONS

The present application claims the benefit of and priority to U.S. Provisional Patent Application No. 60/551,636, filed on Mar. 10, 2004, entitled Wireless Data Access Architecture. The entire contents of the '636 application are incorporated by reference herein in its entirety.

BACKGROUND OF THE INVENTION

1. Field of the Invention

The present invention relates generally to remotely accessing data by a wireless device and interaction between data areas within the wireless device.

2. Description of the Related Art

Internet browsers for accessing data via the Internet are known. Existing Internet browsers download all of the icons, formatting information, text, etc. used for displaying Internet content each time a WebPage is accessed by a user. Such information may be transferred from the data service provider to the accessing device in differing data formats. Transmitting large files is cumbersome for wireless devices, however, due to the limited bandwidth wireless devices commonly use for accessing service providers. Further, even where broadband wireless access is available, a reduction or elimination of large file transfers is desirable to hasten the speed at which the wireless device accesses information from the data service provider.

Wireless devices often also present other limitations beyond mere bandwidth constraints. As an example, cellular phones, personal digital assistants (PDA), and palmtop computers are often limited in their processing, presentation, storage capacity, and/or user ability to navigate through the data provided in comparison to desktop computers and other non-wireless devices. These wireless devices may also have limited intelligence, such as the ability to make use of information available on the wireless device to derive useful information or the ability to manipulate the data meaningfully with other applications on the device. This limits both the inherent capabilities of the wireless device, as well as a user's ability to use, interact, and/or respond to the information presented. Thus, a need exists for an improved remote data access architecture for wireless devices and/or improved wireless devices themselves.

Other problems with the prior art not described above can also be overcome using the teachings of the present invention, as would be readily apparent to one of ordinary skill in the art after reading this disclosure.

BRIEF DESCRIPTION OF THE DRAWINGS

FIG. 6 (including subparts 6A-6G) includes exemplary screen shots from a flight plugin/channel according to an embodiment of the present invention.

FIG. 7 (including subparts 7A-7G) includes exemplary screen shots from an entertainment show time plugin/channel according to an embodiment of the present invention.

FIG. 8 (including subparts 8A-8D) includes exemplary screen shots from a storyboard/news plugin/channel according to an embodiment of the present invention.

FIG. 9 (including subparts 9A-9F) includes exemplary screen shots from a telephone directory plugin/channel according to an embodiment of the present invention.

Figure 1A:
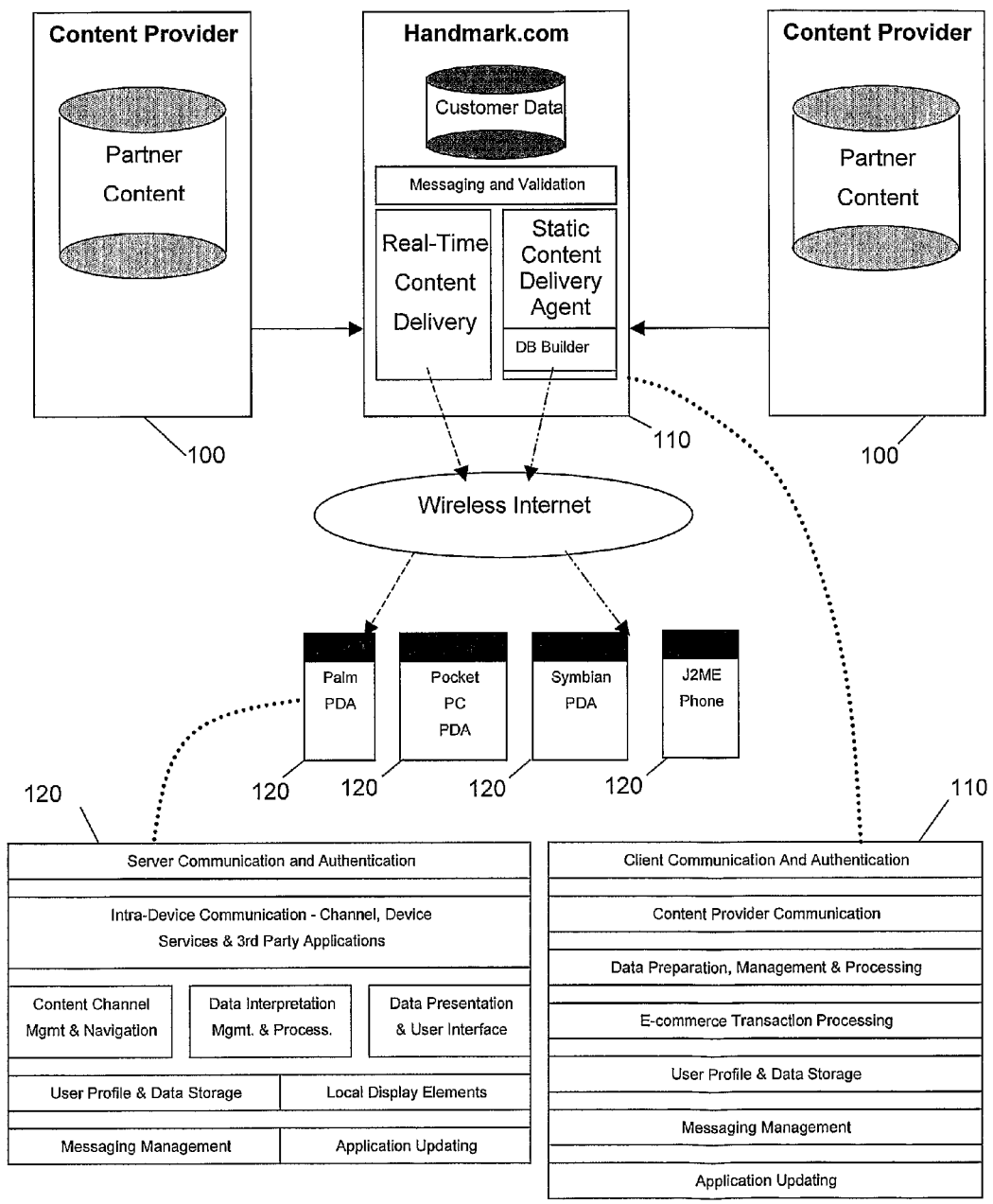
FIG. 1 (including subparts 1A and 1B) depicts a wireless data access architecture according to an embodiment of the present invention.

Appendix A includes exemplary code for a Token Parser class according to an embodiment of the present invention.

Appendix B includes exemplary code for a Cache File Tool Class Overview class according to an embodiment of the present invention.

DETAILED DESCRIPTION OF THE EXEMPLARY EMBODIMENTS

Reference will now be made in detail to exemplary embodiments of the present invention. Wherever possible, the same reference numbers will be used throughout the drawings to refer to the same or like parts.

Various embodiments of the present invention are directed at providing data to and/or accessing data from a wireless device. The term "wireless device" refers to any device capable of accessing data using a wireless communication link. As an example, wireless devices include personal digital assistants (PDA), pocket personal computers (PC), palmtops, and cellular phones. Many different platforms and communication protocols are contemplated for use with embodiments of the present invention, such as Palm OS, Microsoft operating systems (Windows Mobile (WM), Pocket PC, Windows Mobile Smartphone and Windows CE), Symbian (UIQ and Nokia Series 60, Series 80, and Series 90), Java (Java 2 Platform, Micro Edition (J2ME) (both MIDP1 & MIDP2) and RIM), Binary Runtime Environment for Wireless (BREW), WAP 2.0, Qualcomm Trig ML, and Linux. For voice based communications, it is contemplated to use Code Division Multiple Access (CDMA), Time Division Multiple Access (TDMA), and Global System for Mobile communications (GSM) communication protocols. The above communication protocols are all for voice communication. For data based communications, it is contemplated to use 1xRTT, 1xEV-DO, and 1xEV-DV (for CDMA networks), general packet radio service (GPRS) and enhanced data GSM environment (EDGE) (for GSM networks) communication protocols. Thus, the following embodiments are described in reference to these platforms and communication protocols. It should be appreciated, however, that the embodiments of the present invention may be extended to other technologies that communicate over a communication link, including non-wireless technologies. It should further be appreciated that the appearance and operation of various embodiments will differ from one device to another, from one operating system to another, and from one communication protocol to another. As such, the embodiments provided below are for purposes of illustration only.

Various embodiments of the present invention are also directed at launchers, applications, channels, and plugins. Plugins typically manage a certain type of content for a user, such as Weather, News, Sports, Movies, 411, and Maps. A plugin may register itself in a registry on the wireless device 120, which allows a launcher (to be described) to be aware of the existence of the plugin and programmatically execute the plugin when desired. A channel typically manages user specified settings of the overall content. As such, channels often are provided as optional entities inside a given plugin. An example is a weather channel that resides in a weather plugin, where the channel is defined by geographic location or forecast type (e.g., 7-day forecast, 2 day detailed forecast, ski report, etc.). Applications comprise groupings of plugins and related channels. Thus, it should be appreciated that the terms plugin and channel may be construed as data management sub routines of a higher level program referred to as an application. As different providers may offer individual applications (with corresponding optional plugins and channels), a launcher may also be provided. A launcher is aware of the existence of applications, plugins and/or channels on a given wireless device, preferably by periodically checking a registry on the wireless device. For discussion purposes, launchers, applications, channels, and plugins (including 3rd party products corresponding to any one of these four) will be referred to collectively as "software components" as they each form one component of the software operable on a wireless device. It is contemplated to use various embodiments of the present invention with other software components, as would be readily understood by those of skill in the art after reading this disclosure.

Figure 1B:
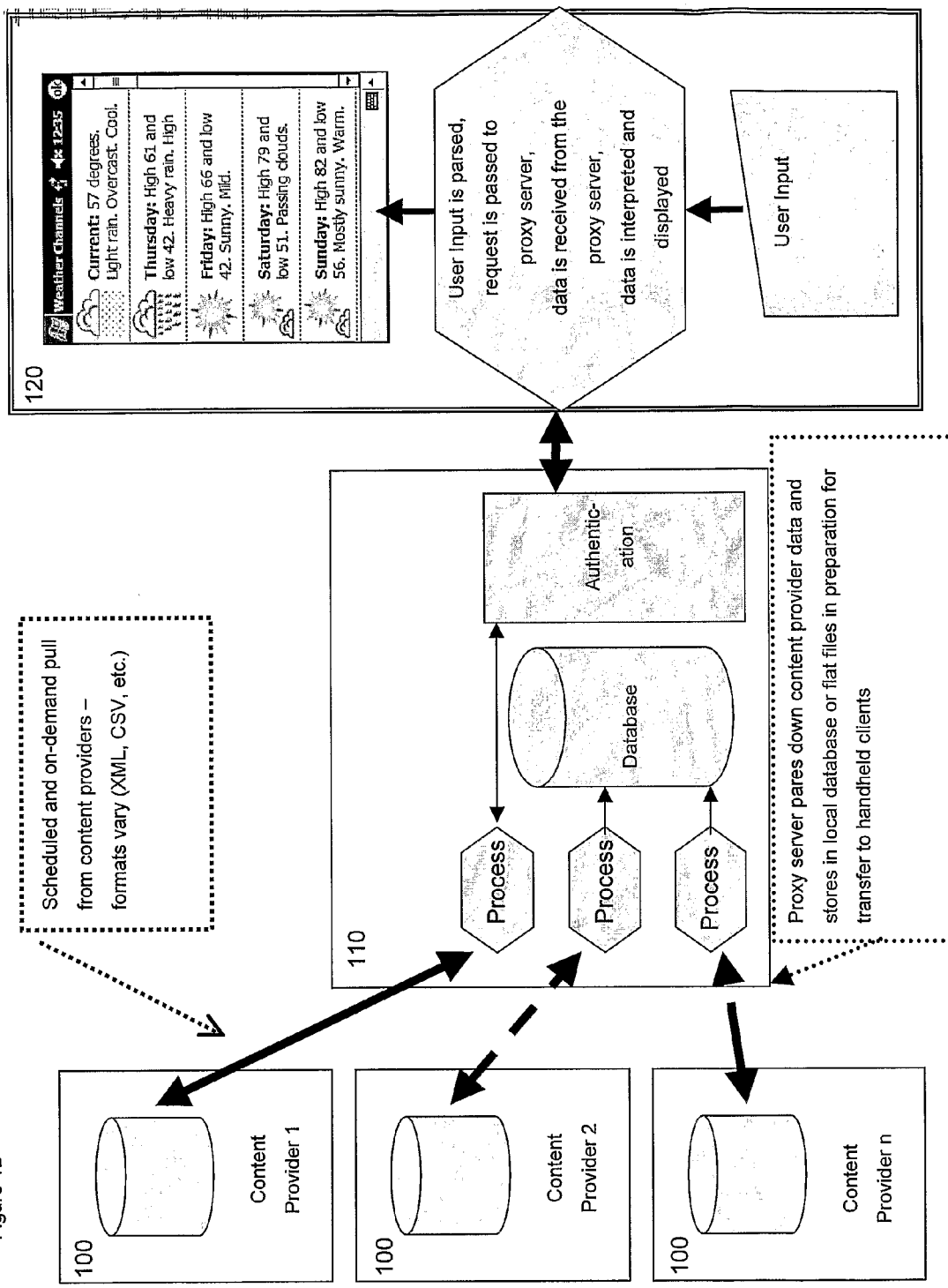

A wireless data access architecture according to a first embodiment of the present invention is shown in the block diagram of FIG. 1 (including subparts 1A and 1B). Generally, an "architecture" may refer to a server (e.g., a server at a data service provider) and components operating on the server and/or a wireless device. The architecture depicted in FIG. 1 includes a data service provider 110 (Handmark.com) in communication with a plurality of wireless devices 120 via a wireless communication link (e.g., wireless Internet). Additionally, the data service provider 110 may be in communication with one or more content providers 100 via a hardwired or wireless communication links (e.g., native Internet). This wireless data access architecture may be used with one or more of various embodiments of the present invention, with or without the noted processing capabilities summarized in FIG. 1B. Exemplary embodiments using this wireless data access architecture are described in greater detail below.

A second embodiment of the present invention is directed at reducing the amount of data transmitted between a wireless device 120 and a data service provider 110. More specifically, a reduction in transmitted data may be achieved by (i) increasing the amount of data stored on the wireless device 120 itself (preferably to a maximum amount); and/or (ii) reducing the amount of data provided from data content providers 100 and/or data service provider 110 to the wireless device 120 (preferably to a minimum amount). By way of example, and in contrast to traditional WebPages, application files may be stored on the wireless device 120 rather than being transmitted each time a data source is accessed by the wireless device 120. In this regard, an application file may comprise data and/or technology elements such as:

Data display elements stored on a wireless device 120 within a client application on the wireless device 120, including:
Icons
Forms and/or Templates
Tables, lists, box scores, standings, etc.
User interface navigation elements, including:
Buttons
Scrolling tools and related subroutines
Device specific user navigation elements (including touch screen)
Integration with hard navigation keys on the wireless device 120
Data used to manage the data that is presented on the wireless device 120, including:
User preferences based on express user choices
User preferences based on prior usage of the wireless device 120 or applications on the wireless device 120 (for example, auto-update durations based on prior usage patterns)
Other data obtained from other applications on the wireless device 120 (for example, native contact/address list stored on the wireless device 120)
On initialization, use of LBS to determine current ZIP Code and then auto-populate relevant user preferences (for example, create a weather forecast for the location, find the X closest theaters to the location, find the sports teams in closest proximity to the location, etc.)
Cached results of previous queries
Technology, including:
Common sub-routines to assemble data components for presentation to user in response to a request
Logic to interpret data passed form a server so that it can be displayed in an efficient and understandable manner using the on-wireless device 120 elements In this manner, only the status/update information required to update the presentation on the wireless device 120 is transmitted from the data service provider 110 to the wireless device 120 via the wireless communication link. According to one embodiment of the present invention, full presentation information is presented to the data service provider 110 (e.g., in 25 Mb+ files) from the content providers 100. The data service provider 110 then distills down only the status/update information (e.g., in less than 15 kb files) for the wireless device 120, which is then transmitted to the wireless device 120. Alternatively, the content providers 100 may distill down only the status/update information before presenting this information to the data service provider 110.

Figure 2:
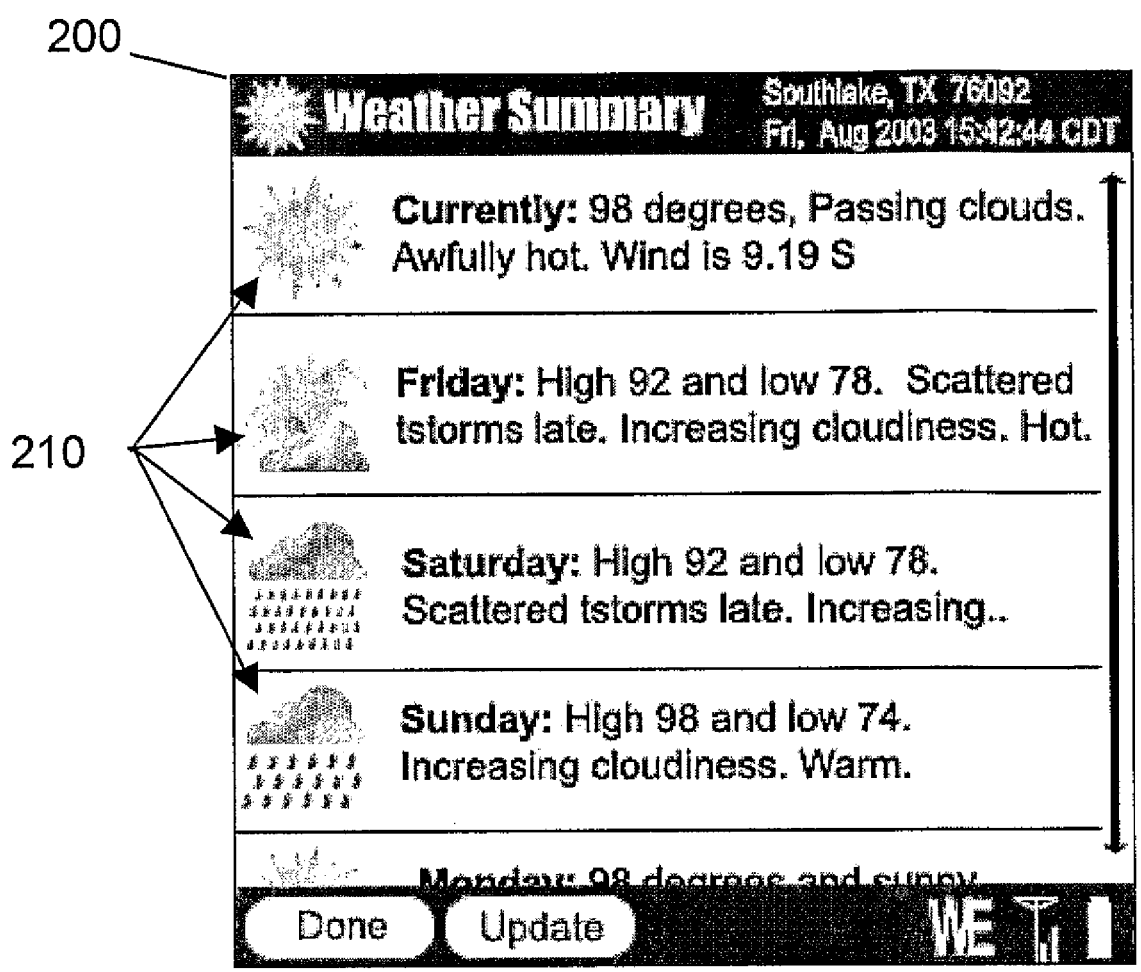
FIG. 2 includes an exemplary screen shot from a weather plugin/channel according to an embodiment of the present invention.

To more fully illustrate this transmitted data minimization concept, an exemplary weather report plugin/channel 200 is shown in FIG. 2. This weather report may comprise, for example, a presentation on a wireless device 120 where a user has accessed the weather report for a given location using the wireless device 120. The icons 210 for various weather conditions (e.g., rain, snow, cloudy, sunny, etc.) and the page formatting information or template (e.g., where the icon appears in relation to the high and low temps, etc.) may be stored on the wireless device 120 at a time prior to accessing the weather report. To display the weather report on the wireless device 120, the wireless device 120 then only has to retrieve the forecast data from the data service provider 110 (which may in turn retrieve the forecast data from a content provider 100). In other words, the icons 210 and page formatting information do not have to be transmitted to the wireless device 120 to present the response to the user's request. Thus, the present embodiment achieves a reduction in the amount of data transmitted from the data content provider 110 to the wireless device 120 when a page is accessed, and also achieves a decrease in the amount of time required to respond to the user's request.

Figure 3:
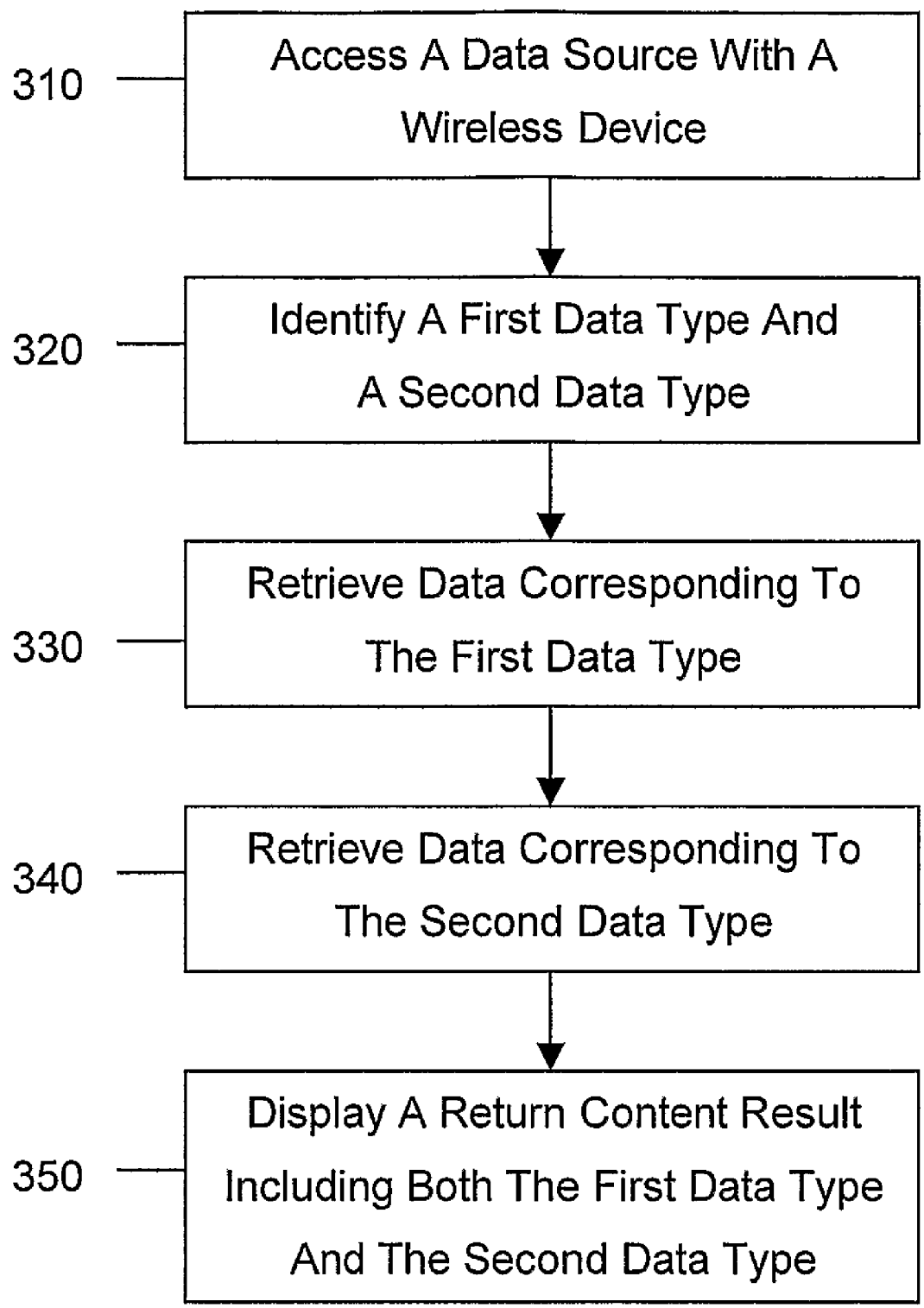
FIG. 3 depicts a flowchart for a method of presenting data for a software component on a wireless device according to an embodiment of the present invention.

A method of presenting data for a software component on a wireless device 120 that takes advantage of a reduction in the amount of data transmitted between the wireless device 120 and the data service provider 110 is shown in the flow chart of FIG. 3. In particular, in step 310 data is accessed using the wireless device 120. Step 310 may comprise, for example, a user initiating a request for the weather report 200 shown in FIG. 2. To present the weather report 200 to the user, data must be provided by the data service provider 110 to the wireless device 120. This data can be divided into a first type and a second type as described below.

In step 320, the wireless device 120 (or application running on the wireless device 120) and/or the data service provider 110 identifies a first data type and a second data type used by the wireless device 120 to present the requested information. The first data type comprises data that must be retrieved from the data service provider 110. As an example, the first data type may comprise needed status/update information (e.g., the weather conditions for a given day). The second data type comprises necessary data that has already be retrieved by the wireless device 120, or that is otherwise present on the wireless device 120. As an example, the second data type may comprise application files, icons 210, etc. as previously described. It is further contemplated that the present embodiment may evaluate the first data type and re-categorize "current" status/update information as part of the second data type, as there is no need to update previously retrieved status/update information if the previously retrieved status/update information is already up to date. It is further contemplated that the first data type might include data corresponding to "new" data. As an example, at 9:00 am there may be ninety new news stories. At 10:00 am there may be only fifteen additional news stories or news stories that have changed. Hence, at 9:00 am data corresponding to ninety news stories falls into the first data type, at 10:00 am only fifteen news stories fall into the first data type.

As described above, the wireless device 120 and/or the data service provider 110 may identify the first data type and second data type—e.g., as a result of interaction between the wireless device 120 and server at the data service provider 110. Preferably, step 320 is performed automatically on or by the wireless device 120, and communicated to the data service provider 110 as part of a request for data from the data service provider 110 that corresponds to the first data type. It is further contemplated, however, to provide user related data as part of step 320. User related data may include, for example: (i) user preferences expressly set by the user in an application on the wireless device 120; (ii) data determined from prior usage of an application or wireless device 120 by the user; (iii) data available from other applications on the wireless device 120 (such as location); or (iv) a combination of one or more of (i)-(iii). To illustrate, the wireless device 120 may provide a list of data available for presentation to the user, such as a listing of movie theaters with a given radius of the wireless device 120. The user may then select a subset of the list of data available, such as the user's preferred two movie theaters. The first data type then comprises the selected data (e.g., movie listings corresponding to the selected two movie theaters) and excludes the unselected data (e.g., movie listings corresponding to the other movie theaters). Other techniques for identifying the first and second data types are also contemplated.

Once the first and second data types have been identified in step 320, the wireless device 120 (and/or system generally) then retrieves in step 330 data corresponding to the first data type from the data service provider 110. As an example, the wireless device 120 may contact the data service provider 110 via the wireless communication link, and request data corresponding to the first data type. The data service provider 110 may authenticate the contact from the wireless device 120 and maintain the contact (e.g., manage the wireless communication link) for the duration of communications between the data service provider 110 and the wireless device 120.

Preferably the data service provider 110 determines, in response to a request from the wireless device 120, the necessary content provider 100. The data service provider 110 the retrieves data from the content provider 100, parses the retrieved data, determines required messaging and/or updates, assembles the data for delivery, and delivers the data to the wireless device 120. If the communication between the wireless device 120 and data service provider 110 involves an e-commerce activity (e.g., purchasing tickets for a movie theater), the data service provider 110 may process the e-commerce transaction and deliver an e-commerce receipt to the wireless device 120 0 and/or a user's other electronic mail account.

Upon receipt of the data from the data service provider 110, the wireless device 120 may interpret the data to determine whether any missing elements exist. Interpretation generally refers to an application on the wireless device 120 evaluating the received data to determine what other elements of the display are required (e.g., if the data code means sunny, the application has to determine that and know to display the sun image for that particular day). Missing elements can then be re-requested from the data service provider 110. When the data transmission is completed, the wireless device 120 may close the contact with the data service provider 110. Other forms of performing step 310 are also contemplated.

The application on the wireless device 120 further retrieves in step 340 data corresponding to the second data type from the wireless device 120 itself (e.g., from flash memory or the like). The data is aggregated for presentation to the user (e.g., as a return content result) on the wireless device 120, and in step 350 displayed on the wireless device 120. Step 350 may be followed by other processing steps, such as updating databases on the wireless device 120, displaying follow up messages on the wireless device 120, and/or updating various software components on the wireless device 120.

As data corresponding to the second data type is not retrieved from the data service provider 110, the total amount of data that must be retrieved from the data service provider 110 by the wireless device 120 can be reduced, thereby improving the efficiency and performance of the wireless device 120.

According to another embodiment of the present invention, the wireless device 120 (in particular one or more applications running on the wireless device 120) may be provided with data linking capabilities for integrating one or more of various plugins/channels or applications on the wireless device 120. The phrase "data linking" refers to the wireless device 120 (or application running on the wireless device 120) having the capability to link data between or exchange data with multiple resources on the wireless device 120, including between an application launcher and an application or plugin/channel in an application, between a plugin/channel and another plugin/channel in the same or different application, between an application (or any plugin/channel within the application) and other applications (e.g., 3rd party software) on the wireless device 120, or some combination of these exchanges. This allows a user to seamlessly move from one software component to another where the data used overlaps (e.g. to only have to enter common data once which is forwarded between software components).

Figures 4, 4H:
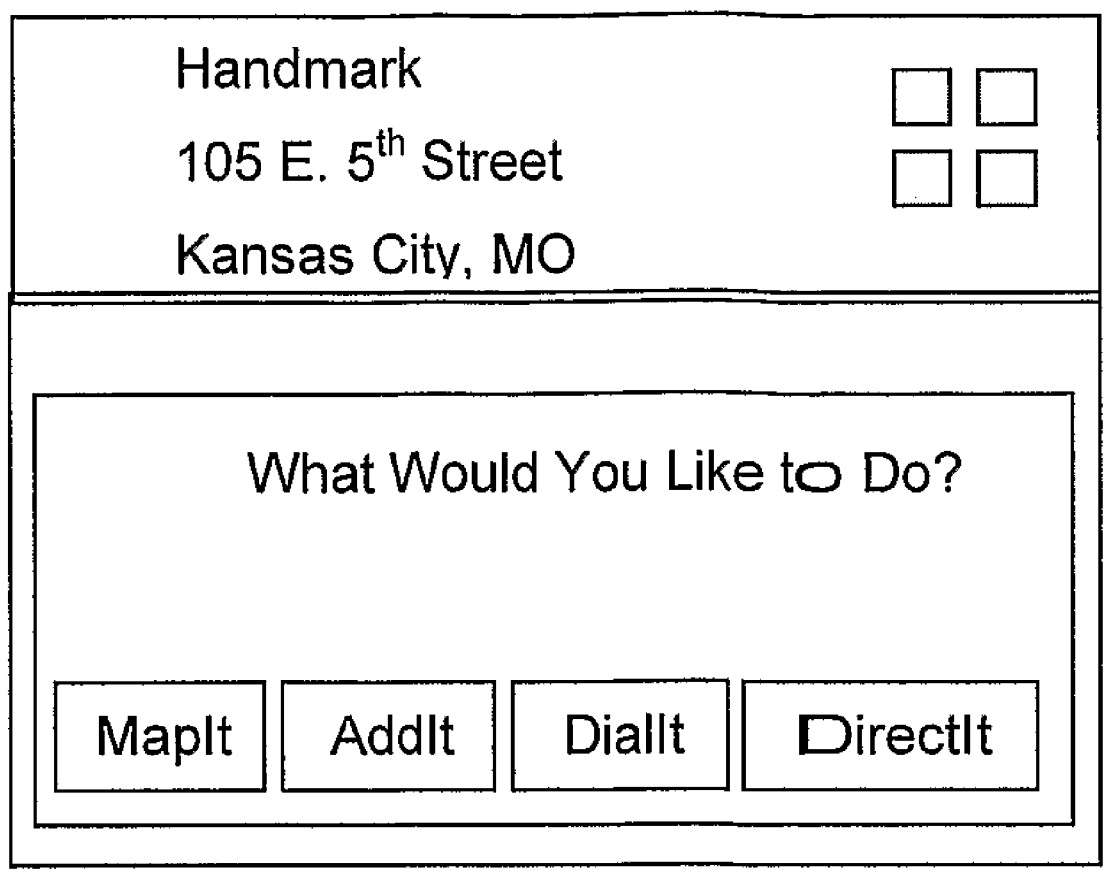
FIG. 4 (including subparts 4A-4H) includes exemplary screen shots from a mapping/driving directions plugin/channel according to an embodiment of the present invention.

To more fully illustrate this concept, data linking between a calendar/address book application and a mapping/driving direction channel/plugin is described below (typically involving data-linking of a channel/plugin to a third-party application). Wireless devices 120 can include mapping/driving direction channels/plugins such as the exemplary mapping/driving direction channel/plugin is shown in FIG. 4 (i.e., FIGS. 4A-4H). Wireless devices 120 can also include calendar/address book applications which include personal information management (PIM) applications, the address book provided in Palm operating system based devices, and the like. Other calendar/address book applications and mapping/driving direction channels/plugins are also contemplated.

A user may access his/her calendar to see upcoming appointments, such as a business trip to Kansas City, Mo. on Jul. 4, 2005. If the wireless device 120 is also equipped with the mapping/driving direction channel/plugin, the user may use the calendar/address book application to look up the Kansas City meeting information, which data is then used by the mapping/driving direction channel/plugin to present the user with driving directions or a map on the wireless device 120. This concept of data linking with the mapping/driving direction channel/plugin is described below in greater detail in reference to FIG. 4.

By way of example, when the address of the plant for the Kansas City, Mo. visit is displayed originally by pulling up the appointment information in the calendar/address book application, the present embodiment may provide the user with a plurality of navigation and/or interaction options such as links, buttons or menu selection items (MapIt [to channel data linking], AddIt [to 3rd party application data linking], DialIt [to 3rd party application data linking], and/or DirectIt [to channel data linking], etc.) (FIG. 4A). The MapIt function automatically loads a mapping plugin/channel in the application, populates the required fields, and initiates a request to the data service provider 110 to return a map. The DirectIt function automatically loads a driving direction plugin/channel in the application, populates the required fields, and initiates a request to the data service provider 110 to produce directions as will be described in regards to further embodiments below. The AddIt function automatically adds the contact information to the any third-party address book application on the wireless device 120. Finally, the DialIt function automatically dials the telephone number provided in contact information (whether or not the user stored the information in the wireless device's address book) using wireless voice capabilities in the wireless device 120, if available. In all four of these functions, information is linked from the appointment to the follow on applications or channels/plugins—i.e., an application, including the plugins/channels, and other applications on the wireless device 120 are "data linked" to provide the user with more efficiency and greater functionality in the use of the wireless device 120.

Similarly, data linking may be used with the weather plugin/channel 200 previously described. As an example, a user could launch the weather plugin/channel 200 from a link (or other navigational element such as a button or menu item) in the calendar/address application on the wireless device 120, the travel plugin/channel, or the mapping/driving direction plugin/channel, to pull up a weather report for a location indicated in the screen from which the weather plugin/channel 200 was launched (e.g., Kansas City in the previous example).

Those of skill in the art will appreciate that data linking as presently described is distinct from linked WebPages at least in that different sources of data are implicated (i.e., independent WebSites versus a single source), the method of presentation is different, accumulation of data by the wireless device 120 versus separate presentations in known Internet browsers, retention of data by a wireless device 120 versus expiring WebPages on known Internet browsers, and the exchange of and interaction with data presented by the present embodiment, its plugins/channels, other applications on the wireless device 120 and/or a combination of these. Further, as individual plugins/channels are being linked, the data exchange format between plugins/channels differs substantially from that of providing via HTML common data for a subsequent WebPage to the same Internet browser in accessing that subsequent WebPage—by way of example plugin/channel linking typically requires both a sharing of data and a call to pull up the second plugin/channel. Other distinctions also exist.

Figure 5:
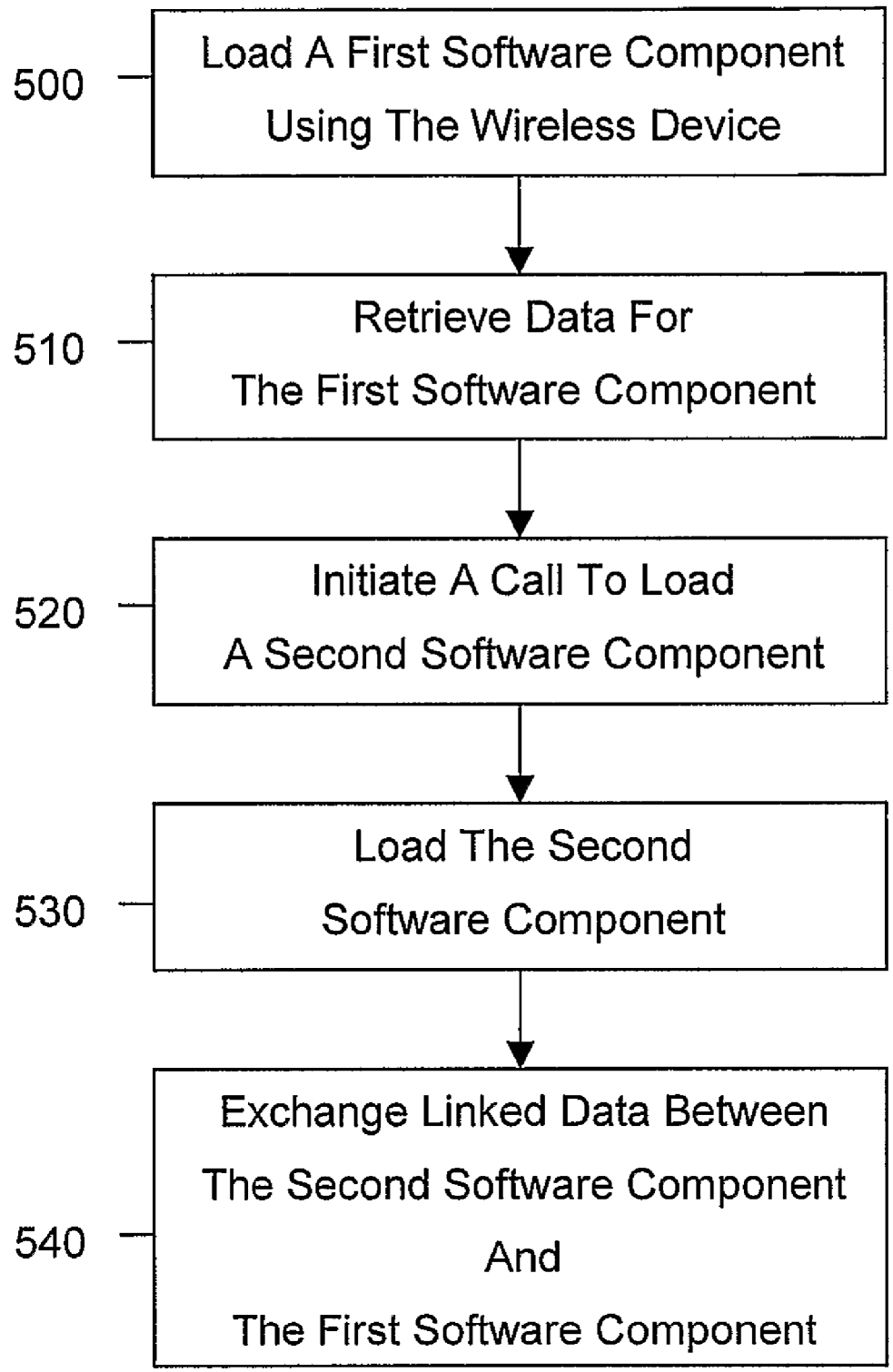
FIG. 5 depicts a flowchart for a method of linking data between software components on a wireless device according to an embodiment of the present invention.

A method of linking data between software components on a wireless device 120 will now be described in reference to the flow chart shown in FIG. 5. In particular, in step 500 the wireless device 120 loads a first software component such as the previously described weather plugin/channel, mapping/driving direction plugin/channel, calendar/address book application, etc. Step 500 may be initiated by user selection of a software component using the wireless device 120, or in response to an action taken by the user (e.g., a default operation performed upon device power up).

In step 510, the wireless device 120 (or more specifically an application running on the wireless device 120) retrieves data from the data service provider 110 for the first software component loaded in step 500. As an example, an application may retrieve data in a manner as previously described in reference to the method depicted in FIG. 3.

At some point during operation of the first software component, an application (e.g., the first software component itself) on the wireless device 120 may initiate a call to load a second software component. As an example, a user viewing an address in a 411 plugin/channel (a first software component) may select "MapIt" for a mapping/driving direction plugin/channel (a second software component) as previously described in reference to FIG. 4H. In step 530, the second software component is then loaded in response to the call initiated in step 520.

During the loading of the second software component or after loading has occurred, linked data is exchanged between the second software component and the first software component—it may be forwarded from the first software component to the second software component or retrieved by the second software component from the first software component. As an example, the calendar/address book application (a first software component) may exchange address information (linked data) with the mapping/driving direction plugin/channel (a second software component). In this regard, it should be appreciated that in order for data linking to occur, at least a portion of the data retrieved by the first software component must be linked to the second software component. Thus, it is contemplated for a portion of the data retrieved or presented by the first software component to not be linked to the second software component. Similarly, it is contemplated that the second software component may retrieve, from the data service provider 110 or other software components on the wireless device 120, additional data that is necessary to present the response to the user's request related to the second software component. Other variations are also contemplated.

Figure 10:
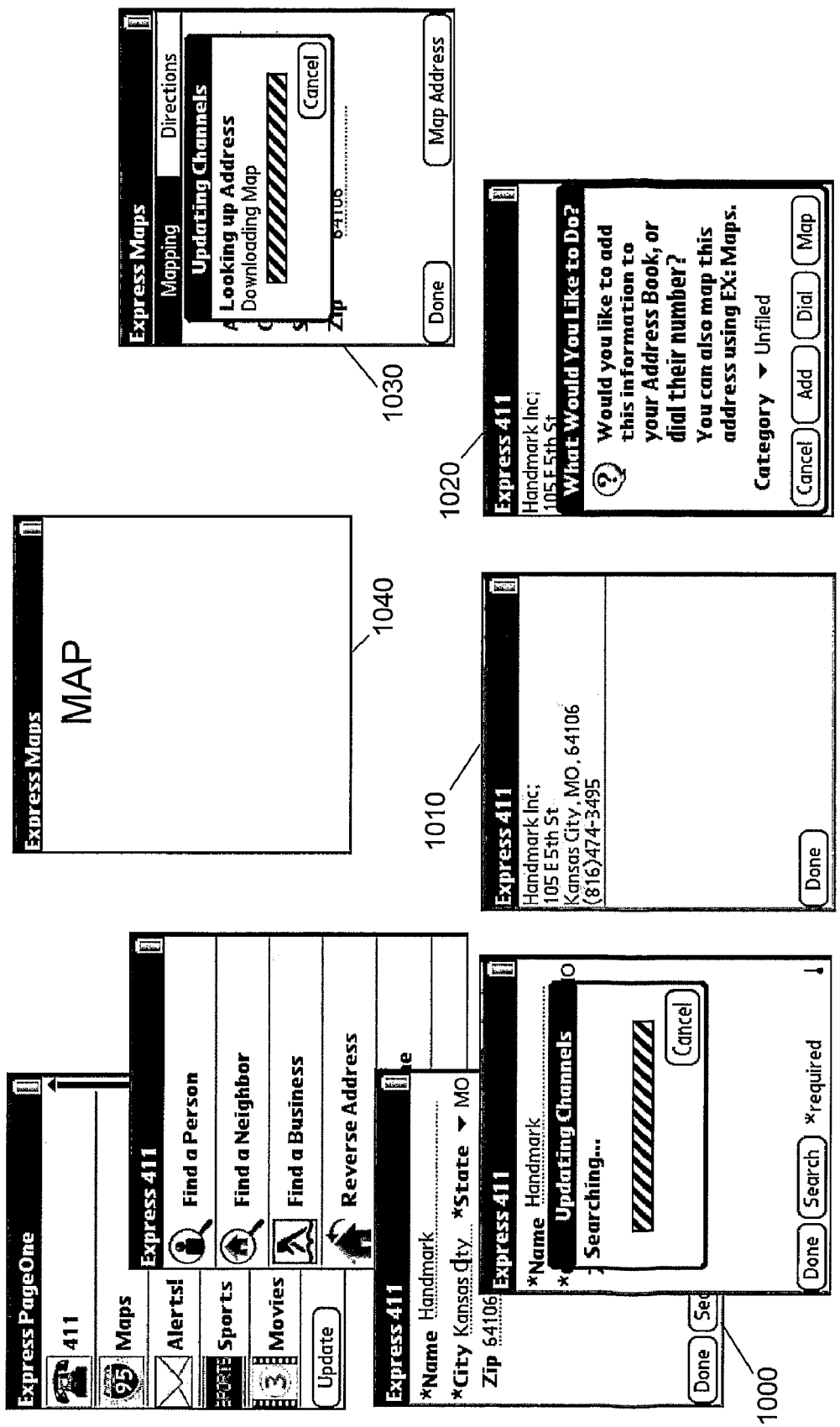
FIG. 10 shows screen shots walking step by step through a data exchange between a 411 channel/plugin and a mapping/driving direction channel/plugin according to an embodiment of the present invention.

This data linking capability is further shown in FIG. 10. In particular, in screen 1000 a user inputs data into a 411 channel/plugin and initiates a request to the data content provider 110. In screen 1010, data is returned to the 411 channel/plugin, interpreted and displayed accordingly. In screen 1020, the user initiates an action requiring a mapping/driving direction channel/plugin. The 411 channel/plugin then makes a call to the mapping/driving direction channel/plugin, which is launched/activated. In screen 1030, data is exchanged between the 411 channel/plugin and the mapping/driving direction channel/plugin, and supplemental data is requested by the mapping/driving direction channel/plugin to the data content provider 110. The data is then returned to the mapping/driving direction channel/plugin, interpreted and displayed accordingly.

By providing the noted data linking capability, the amount of data the wireless device 120 has to retrieve from the data service provider 110 can be reduced (e.g., exchanged information does not have to be re-retrieved). In addition, the wireless device 120 has improved efficiency and ease of use (the user does not have to re-key data) and intelligence (the applications on the wireless device 120 have increased productivity because they can utilize data available in the wireless device 120 rather than just in the given software component), by automatically exchanging linked data. As such, the data linking capabilities disclosed enhance the operation and capabilities of the wireless device 120.

Another embodiment of the present invention is directed at features involving the noted launcher software component. In particular, the launcher may serve as (i) an aggregator, or framework, to manage, present, launch and close all plugins; (ii) a single-point of common data entry, retrieval and management such as the user profile; (iii) a resource for routines and features that are common to channels, such as an auto-update scheduling mechanism; (iv) a common interface between the wireless device 120 and the data service provider 110 to assist in the management of the communications between them; (v) a centralized location for communications and/or transactions (e.g., e-commerce) with the user; and/or (vi) a mechanism to update some or all of the software components on the wireless device 120, including updating existing plugins/channels, adding new plugins/channels, removing old plugins/channels, and/or implementing new features. In this regard, the launcher may communicate with the plugins/channels through any number of application program interfaces (API). One launcher API includes "UPDATECONTENT", which, for example, launches the plugin/channel, performs the default update and returns to the launcher. This may be used for full updates of the data in an application, as each plugin/channel is updated in succession. Another such API includes "LAUNCH", which launches the plugin/channel and returns to the launcher when the user exits the plugin/channel. This allows the user to view the content in the plugin/channel and return to the plugin/channel list in the launcher. In other words, the launcher presents the plugins/channels buttons, then when clicked, the plugin/channel is launched, when the plugin/channel is closed, the user returns to a default plugin/channel or list of plugins/channels. Yet another such API includes "RETRIEVEUPDATESUMMARY", which retrieves the last content update time and a short summary of the update from the plugin/channel. This will allow the launcher to display a summary and date/time of the last update in the list up plugins/channels. A final such API includes "USERINFO", directed at a means of accessing/updating common user information for the account verification and other default data used in plugins/channels across all applications. This may simply be a database that all applications will access to pull default location setting and account management information.

Preferably, the launcher will call a plugin/channel via one of at least two methods, a sub-call (SysAppLaunch) method and a switch (SysUIAppSwitch) method. The "sub-call" method expects control to be returned to the launcher when the plugin/channel exits. This method can be used in cases when a plugin/channel does not fully launch, such as notifying a plugin/channel to update with a proxy server or showing a dialog (if needed). In contrast, the "switch" method preferably turns over control to the plugin/channel itself. This method can be used when the plugin launches fully. Under a "switch" call, control is typically passed back to the launcher only if the plugin/channel explicitly launches the launcher via SysUIAppSwitch. It should be appreciated that calling the plugin/channel via the "switch" method allows the plugin/channel to have access to global variables. Thus, during a "switch" method call, before making a SysUIAppSwitch call, the calling application should use MemPtrSetOwner to change ownership of the parameter block (if any) to the OS to insure the memory is not freed before the plugin/channel is called. Generally, this will only apply if the parameter block is used. It should be appreciated that the system calls noted above are all Palm OS specific. Similar mechanisms are used on other platforms, but have different names.

Yet another embodiment of the present invention is directed at customization of a wireless device 120. Using the weather plugin/channel 200 shown in FIG. 2 as an example, a user may purchase this plugin/channel and reprogram a hard button on the wireless device 120 with the weather plugin/channel. Once reprogrammed, tapping the hard button once launches the weather plugin/channel 200 and tapping it twice launches the weather update (similar to a snappermail application). However, if the user has the launcher installed then the launcher could be reprogrammed on the hard button and two clicks button presses will launch the wireless updates for the plugins/channels. Other configurations are also contemplated, such as tapping on information, pushing a menu button on the wireless device 120, etc. In this regard, any means for activating a function may apply, such as activating a touch screen on the wireless device 120, using other navigation/input methods provided on the wireless device 120 (e.g., a 5 way navigation device as present on the Treo 600), etc.

It should be appreciated that, in addition to the aforementioned techniques, customization can take on many other forms. Customization may include auto-population of fields in a plugin or channel. As an example, a wireless device 120 may auto-populate content channels with the user's default location. Once the user enters their default zip code, that zip code will automatically deliver internet content for that location. By way of example, the user enters 94022 as their default zip code and a "Current and 7 Day" weather forecast will be created for the Los Altos, Calif. area within the weather plugin/channel.

According to another embodiment of the present invention, a common database may be created for storage of data to be accessed by the launcher and plugins/channels. Since it will be possible for a plugin/channel to be installed in the absence of the launcher, the plugin/channel and launcher may both be capable of creating this database if it does not exist.

The common database typically contains account information and the data common to more than one software component including preferences that will be set by the launcher or user, such as default city, state, zip. The common database may also contain data used to manage the plugins/channels, such as an overview record for each plugin/channel that the launcher will access to display a highlight of the plugin/channel information. For the weather plugin/channel 200, this might be just the high, low and current temperature for today. Each plugin can be sub-called with a command to update its information via the proxy server to insure the overview record is up-to-date. This overview record may contain the following information: creator id of plugin, short description of plugin such as "Weather", overview details of plugin such as "Currently: 85, Low: 72, High 89", timestamp of last update, etc.

According to another embodiment of the present invention, this common database may contain plugin/channel registration records for the management of the plugins/channels. Each record may contain a creator id of a registered plugin/channel. The plugin/channel may be responsible for insuring that it is registered so the launcher will be able to call and manage it. If the launcher finds a registration that is no longer valid (plugin/channel has been removed), then the launcher may remove that record from the database allowing the data service provider 110 to turn plugins/channels on and off. Implementation of the common database can be one database with different types of records (described above) and each record having a "type" field. Alternatively, each type of record could reside in a separate database of the same type of data. It should be appreciated that each plugin/channel may (additionally or alternatively) create, maintain, and/or use its own database(s) and record format to store data, such as comprehensive data that is retrieved from the data service provider 110. It is further contemplated to upload a profile created on the wireless device 120 to the data content provider 110. If the user then changes to a different wireless device 120, the new wireless device 120 will be able to retrieve the profile from the data content provider 110 such that the user is not required to re-input preferences.

According to yet another embodiment of the present invention, the launcher calls plugins (sub-call or switch) with one of the following launch codes: "sysAppLaunchCmdNormalLaunch" and "sysAppLaunchCmdUpdateInfo". The launcher calls SysUIAppSwitch with sysAppLaunchCmdNormalLaunch when a plugin/channel is to be fully launched. Calling via this method insures the plugin/channel has access to global variables (i.e., the method of the call results in global access). Upon launch, the plugin/channel performs as designed. A user can return to the launcher via tapping a "Done" button or equivalent. If the user exits the plugin via tapping on the "Done" button on the screen or any other means, the plugin preferably displays the main screen.

The sysAppLaunchCmdUpdateInfo launch code is a custom launch code. The launcher and plugin/channel code may contain the definition "#define sysAppLaunchCmdUpdateInfo 0x8001" for this launch code (example specific to Palm OS). The launcher calls SysAppLaunch with sysAppLaunchCmdUpdateInfo to request the plugin/channel to update its overview record in the relevant database (given there may be a variety of data structures). The launcher may establish a network connection to the data service before calling each plugin/channel. Then the launcher may keep the network connection open long enough for the each plugin/channel to update during the same network connection. Each plugin/channel should also call NetLibClose and pass "false" for the immediate parameter before returning control to the launcher. Where the present embodiment is used with a Palm OS, the plugin/channel should return control to the launcher by returning from it's PilotMain function with a zero or error code.

The launcher preferably provides one or more of the following functions:

1. Interface to maintain/manage data for it and/or the plugins/channels.
2. Call, manage, close, sub-call each plugin/channel to request plugin/channel to update with service provider on demand or via a scheduled update.
3. Initiate, manage and close the connection with the data service provider 110 (on demand or via a scheduled update) between the launcher, plugins/channels or both
4. Display overview information from each plugin/channel.
5. Ability to launch any given plugin/channel.
6. Ability to add/remove plugins/channels. The launcher may discover new plugins/channels via the service provider and download them as the user wants them or remove ones that are no longer available.
7. Authentication between wireless device 120 and service provider 110.
8. Manage communications (e.g., messages, display terms of use and end user license) between service provider 110 and user.
9. Update current launcher and plugins/channels as needed
10. Update All functionality
11. Auto-Update functionality Other features and configurations are also contemplated.

Screen shots are shown in FIG. 6 (i.e., FIGS. 6A-6G) for a flight information plugin/channel usable with the aforementioned launcher. In this regard, it should be appreciated that a user is preferably able to access data from a particular plugin/channel from different approaches to reach the ultimate information the user desires. For example, in the airline plugin/channel, a user can go by number, time, or airport. A user also has ability to search service provider for the necessary information (e.g., airline code for flight info) and upon selection the information is automatically added to the main search criteria.

Preferably, when the flight plugin/channel is launched it defaults to display the "Find a Flight by Flight Number" screen shown in FIG. 6A, and the date defaults to today's date. The user selects the date and enters the airline code and flight number to search for a flight. If the user does not know the airline code the user can press the "Lookup" button which will display the airline code lookup page. The user then enters the airline name, then presses the search button to retrieve a list of airlines shown in FIG. 6B. The user will select an airline and press the "OK" button which will take them back to the find a flight page with the airline code populated. The user will press the "Search" button to search for the flight information requested.

If the user chooses the Airport-Airport button the search area will change to display the date, departure time, departure airport code and arrival airport code shown in FIG. 6D. The date should default to today's date. The user can choose the date and arrival or departure time with the drop down lists. The exemplary time selections are 12 am-6 am, 6 am-12 pm, 12 pm-6 pm, or 6 pm-12 am. The user can tap the "Lookup" button to search for the flights that fall within the defined search. When selected it populates the field in the previous find a flight.

If more than one flight is found from the search, a list should be displayed as shown in FIG. 6F. This list functions like all other lists in the launcher and/or plugin/channel (yellow selection, 5 way, etc.). The "Done" button of left 5 way should return the user to the flight search page. If only one flight is found from the search (as in a flight # search) the launcher should navigate directly to the flight summary page (see FIG. 6G) and skip the flight list (see FIG. 6F). If multiple results are found, the user can make a selection to reach the summary information for the particular item in the list presented. As an example, this may include clicking on items on a touch screen, using handset buttons to highlight the desired choice, etc. For example, the flight summary page shown in FIG. 3G.

The flight summary page shown in FIG. 6G displays the arrival and departure times of the information retrieved. It also allows the user to update the information from the "Update" button or pull more information such as gate, baggage claim, current flight status, etc. through the "Details" button. The flight inquiry returns as many as 4 times for each arrival/departure. An exemplary display format includes:

1. If an "actual time" is retrieved then the event (departure/arrival) has been completed. Therefore the text should read as "Departed ATL at 8:30 am" or "Arrived DFW at 9:43 am"
2. If there is no actual time then the event has not yet been completed. In this case, it should have a "scheduled time" and may also have an "estimated time"
   a. If there is no estimated time then say "Scheduled to depart at 9:30 pm"
   b. If there is an estimated time then say "Scheduled to depart at 9:30 am and estimated to depart at 9:45 am"

According to one embodiment of the present invention, the user is provided with the ability, through various means, to examine any detailed information available that is not presented in summary page. Preferably, if the user taps the "Details" from the summary page (FIG. 6G) then another query will pull (e.g., initiate a new connection with the service provider or just retrieve relevant data from device databases or other software components on the wireless device 120) the full details for this flight. The details may include gate, baggage claim, meal, flight comments, cancellation notes, meal, on time performance and flight tracking information (lat long, speed, altitude, flight image, etc.). This information may all be available on this scrollable form, though it may or may not be depending on the amount of data to be depicted or based on the particular plugin/channel at hand.

Once the desired flight is retrieved, the user can use the data in different ways, including transferring it to other plugins/channels or 3rd party applications (via data linking) on the wireless device 120. For example, the user has the option to add it to their calendar. The information added to the calendar may include one or more of airline, flight number, departure time, arrival time, departure airport and gate information, and arrival airport.

Screen shots for a movie information plugin/channel with the aforementioned launcher according to another embodiment of the present invention are shown in FIG. 7 (i.e., FIGS. 7A-7G). A first task is to search and display show times for all movies or a specific movie at the user's favorite theaters. Preferably, this is part of the base information that the user provides (either by selecting particular theaters or providing other relevant address information) or is gathered from the wireless device 120 (for example, the current location of the wireless device 120), all of which is either requested at the time of the query or is stored in the database for use by the plugin/channel. The user may primarily be interested in the list of movies with the movie name, genre, rating, time playing, show time and theater name. The user may secondarily be interested in the movie details including the cast, description, etc. Hence, the launcher or plugin/channel may control the amount of the data downloaded based on user defined preferences and/or its ability to self detect the network speed, such that, in the present embodiment, this information may only be available if the user chooses the "Include Movie Details" in the search as low bandwidth users may not want to bring this information down for all movies. Users who do not pull the full movie details on the initial search may choose to do so from the movie details screen for a selected movie. Users may also be interested in the theater details related to a show time. This includes the address, ticket prices, etc. The address of the theater may be linked into the mapping/driving directions plugin/channel as previously described in regards to data linking. The user may also search for a movie name with the same user-defined location or theater. In the case of an update of the movie channel, the update would update all defined theaters as well as information based on other approaches to the topic. Hence, there are at least three distinct types of updates: (i) at a launcher level update all, which updates all plugins/channels; (ii) at a plugin/channel level, which updates just the plugin/channel (and particular type of current or default search); and (iii) within the plugin/channel, which only updates detailed information as needed by the user.

A secondary task is to search and display show times for all movies or a specific movie name at a user-defined location or theaters. This is useful for travelers who typically do not want to search for movies outside their favorite theater list. The user may search for a location with a City/State or Zip. This will return all movies (and theaters/show times) in that local area, assuming they don't hit the maximum number of returned locations or show times. For instance, there are 185+ theaters in New York, N.Y. so it is not feasible to return all the movies for these theaters. Hence, a warning message may be generated when such a search is entered, the warning message notifying the user to enter more specific search criteria. This may be true for other plugins/channels as well. E.g. on the 411 plugin/channel (FIG. 9), the user may get a similar warning message if it returns too much information as defined by the application (either server side or device side) and/or other means (e.g., user, bandwidth, device available memory etc). The user may also search for a movie name with the same user-defined location or theater.

FIG. 7A shows a primary screen on the movie listing application. The "Update" button updates the show times for all movies showing at their "My Theaters" list. The "New Search" button will allow users to create a show time search at a user-defined location. This screen should include all the information necessary for a user to decide on a movie but no more. By way of example, this may include the name, genre, rating, length show times and theater.

Selecting a movie from the show time list (FIG. 7A) will display the movie details shown in FIG. 7B. In other words, once the initial results have been returned, the user will have the ability to expand the information obtained the navigating through the particular details, such as the cast, director, time, release date, running time and review. The user can choose the "Theaters" button to view the detailed information on the theaters (FIG. 7C) returned in the show times search.

If the user chooses not to return all the movie details (in the show time search) then only the name, genre, rating and length are displayed. A button for "Movie Details" will query (e.g., initiating a new connection to the service provider or looking to the local database(s)) for the full details on that movie and display it. Selecting "Theaters" from the movie details list (FIG. 7B) displays all details on the theaters (FIG. 7C) displaying showing movie (that were returned in the results). From here a user should be able to select a theater to add it to their favorites list (if it is not already there) or map it.

From the "New Search" button on the main show times listing (FIG. 7A) users will have the ability to search either by a specific movie name or all movies at a specific location (or theater) or using their 'My Theaters' list (FIG. 7D). Since this may be a dynamic form, the fields are displayed or removed based on the drop down selections (see FIG. 7E). This will drastically simplify the user interface (UI) from the user's perspective. This exemplifies another way that the volume of data may be managed—i.e., by having dynamic forms/search queries, data presentations based on a variety of factors—available bandwidth, user preferences, subject matter and search approach to subject matter, etc. The theater name, city, state and zip are only displayed if the user chooses to search by location. The user may choose to search for a specific theater or just a City/state or zip location. However, there may be limits to the number of results so the user may be asked to add more criteria if their results returns too many results. Clicking the "Search" button will run the search and display the show times list. Clicking the "Done" button will return the user to the old show times list.

The 'My Theaters' list (FIG. 7F) may be accessible from the menu of any list page. In this regard, each channel as well as the application may have any number of both unique and application wide "Menu" items associated with it. The items are accessed by activating the menu function on the particular wireless device 120. In the present embodiment, the user may enter a theater name and a city/state or zip. The user may also enter just the city/state or zip. If one theater is returned it should be added to the list. If more than one theater is returned then a list will be displayed (similar to the my theaters list) where the user can choose which theater to add (FIG. 7G). The user may also select a theater from their "My Theaters" list and remove it by tap-and-hold or use the drop down menu to remove a theater, or by any other activation means as previously described.

According to one embodiment of the present invention, the user may also be able to purchase tickets via the wireless device 120 by selecting an appropriate quantity from a drop down menu in the theater listing plugin/channel. The information is then passed to a third-party application using data linking as previously described.

Screen shots for a mapping plugin/channel (roads, topographical or other) usable with the aforementioned launcher according to another embodiment of the present invention are shown in FIG. 4 (i.e., FIGS. 4A-4H) as previously described. When the mapping plugin/channel is launched, it may default to the screen shown in FIG. 4A (mapping) or 4B (driving directions) depending on the user's preferences.

Using the mapping plugin/channel 4A as an example, the user may enter appropriate address information (or use the Lookup Address button) to retrieve the entered location shown on a map (including surrounding area based on scale of display, with or without points of interest/restaurants/ATMs/gas stations etc. within a given distance of a particular location). See the exemplary map display of FIG. 4C. According to one embodiment of the present invention, an entire map program (or entire map program for a region of interest) is stored on the wireless device 120 to eliminate the need to retrieve data from the data content provider 110. While the + Zoom – feature is shown, other mapping features may also be provided such as panning or depiction of points of interest (POI).

From the map display of FIG. 4C, the user may obtain driving directions to a given place of interest. In particular, the user may select the Origin or Destination buttons to enter an address on the form shown in FIG. 4B. This may include the ability to lookup in a third party address book on the wireless device 120, such as that previously described, in order to retrieve an address from another application. Such a technique is shown in FIGS. 4E, 4F, and 4G, where a contact information entry (e.g., the Kansas City, Mo. plant visit previously described) is used as an address entry for a obtaining a map (FIG. 4F) or the Origin/Destination of driving directions (FIG. 4G).

According to an alternative embodiment of the present invention, the wireless device 120 includes location awareness capabilities (global positioning system (GPS) or cellular tower triangulation), which may be used to provide origin address information. In this regard, it is contemplated to use GPS locating and similar techniques that are limited in their accuracy (e.g., only as accurate as the plugin/channel requires). As an example, if the GPS location is being used for the mapping plugin/channel described above, the GPS location information may be accurate up to a single city block. Similarly, if the GPS location is being used for movie theater locations or weather, the GPS location information may be accurate up to a single zip code.

Limited GPS accuracy may be performed through use of GPS application programming interface (API) that allows for various levels of accuracy to be requested. In such an embodiment, the plugin/channel can set the accuracy it needs:

```
For Weather:
//# helper.m__GetLocation = m__isLBS;
//# helper.m__gpsAccuracy =
HttpProxyHelper.GPS__ACCURACY__LOW;
For Movies:
//# helper.m__GetLocation = m__isLBS;
//# helper.m__gpsAccuracy =
HttpProxyHelper.GPS__ACCURACY__LOW;
```

For Maps: Default GPS request is high accuracy and preferably is not altered.

When placing the GPS request the wireless device 120 can check to see the accuracy needed from the plugin/channel.

```
//# if (m__GetLocation)
//# {
//#     Gps.startSession(this);
//#     Gps.requestPosition(Gps.SVC__TYPE__LOCATION);
//#     switch(m__gpsAccuracy)
//#     {
//#     case GPS__ACCURACY__LOW:
//#         Gps.setQoS(0);
//#         Gps.setOptimizationType(GPS.OPTIMIZE__FOR__SPEED);
//#         break;
//#     case GPS__ACCURACY__MEDIUM:
//#         Gps.setQoS(123);
//#         Gps.setOptimizationType(GPS.OPTIMIZE__FOR__SPEED);
//#         break;
```

```
//#         case GPS_ACCURACY_HIGH:
//#             Gps.setQoS(255);
//#             Gps.setOptimizationType(GPS.OPTIMIZE_FOR_ACCURACY);
//#             break;
```

Location information can then be provided by the GPS, and used to populate location related fields of a given plugin/channel. This may be used, for example, with the mapping/driving direction plugin/channel previously described. Display of a map and/or driving directions using such a feature is disclosed in greater detail below.

With localization information provided (e.g., using the aforementioned techniques), direction information may be presented by the mapping/driving direction plugin/channel in a number of ways. For example, images can be provided to give the user instant recognition of each step (e.g., a right turn arrow), the user could be shown a highlighted route on the displayed map, and/or the user could be shown a set of turn by turn directions. Turn by turn directions can be depicted by retrieving a route information from a data content provider. The plugin/channel may include voice features, which could read the instructions to the user through the speaker or other voice communications capabilities of the wireless device 120.

Screen shots for a storyboard/news plugin/channel usable with the aforementioned launcher according to another embodiment of the present invention are shown in FIG. 8 (i.e. FIGS. 8A-8D). Preferably, the user has the ability to choose the categories of news, number of stories per category (3, 5 or 10) and either a full or summary story from the news setup screen shown in FIG. 8A. If the user chooses summary, the user can still choose to download the full story when viewing the summary. When the user selects a story the full or summary will be displayed (based on their selection in the setup screen).

The main story list shown in FIG. 8B displays all the currently downloaded stories and the last updated date/time. Stories may be organized in any number of ways by the user. Possible ways include sub-channels or icons, such as an icon may be added to the left to identify the news category (e.g., top stories, politics, science, business, world, sports, entertainment, etc.).

The story summary page shown in FIG. 8C is displayed if the user has selected to download just the summaries in the setup screen. If the user taps the "Full Story" button it may query the service provider for the full story and take the user to the full story screen shown in FIG. 8D. The "Done" button will take the user back to the main story list shown in FIG. 8B. Note, there is no need for the summary screen if the user chooses a "Full Story" button in the setup screen as generally this will not display the summary.

The full story screen shown in FIG. 8D is similar to the summary screen shown in FIG. 8C except there is no 'full story' button since the full story is already on the wireless device 120. If the user selected 'full story' in the setup screen then this screen is displayed when the user chooses the story from the main story list. When they select done it takes the user back to the main list shown in FIG. 8B. The user can also download other components of the story, such as images, if such components are available.

If the user navigates to this screen by pressing the 'full story' button from the summary screen (thus querying for the full story) then tapping the done button takes them back to the main list shown in FIG. 8B.

Screen shots for a 411 (phone listings plugin/channel similar to common white/yellow pages) plugin/channel usable with the aforementioned launcher according to another embodiment of the present invention are shown in FIG. 9 (i.e., FIGS. 9A-9F). Preferably, this plugin/channel defaults to one of the search categories shown in FIGS. 9A, 9B, 9C, 9D and 9E depending on user preference (set by the user in the launcher) or prior usage, or the user may just choose each time. This includes:

FIG. 9A—Find a person. Last name and City is required.

FIG. 9B—Find a neighbor. House#, Street and City is required. This may always bring back a default 10 neighbors, and/or be user definable.

FIG. 9C—Find a business. Name and state required.

FIG. 9D—Reverse address lookup. House#, Street and City required.

FIG. 9E—Reverse phone look up. 10 digit phone number required.

Preferably, any one of the searches shown in FIGS. 9A-9E generates a listing page, such as that shown in FIG. 9F. This listing page may be encoded with data linking capabilities, where selecting the returned information will give the user the ability to perform one or more of:

1. Dial it (default if it is a smartphone)
2. Add it to the available address book (default if it is not a smartphone)
3. Map it
4. DirectIt Additionally, each of these capabilities may also or alternatively be available through the selection drop down and menu drop down.

The previous several embodiments were directed at specific plugins/channels usable with the wireless device 120. Another embodiment of the present invention is directed at tools for developing the plugins/channels themselves. More specifically, one embodiment of the present invention is directed at a plugin/channel developer's kit that allows developers to easily create a plugin/channel for a wireless device 120 (or applications running on a wireless device 120). A significant portion of the registration code may be provided within the development kit such that the developer simply needs to pass a few parameters to make the new plugin/channel recognized by the application launcher. After the new plugin/channel is recognized by the application launcher, the plugin/channel can receive and choose to respond to update messages from the application launcher.

Another embodiment of the present invention is directed at classes useable with the aforementioned developer kit. A "class" describes a particular kind of object. It may contain related methods and/or variables. The following embodiments are directed at exemplary classes.

SupportScrolling Helper Class

This class allows the developer to add support for vertical scrolling to their view class by simply deriving from CSupportScrolling and providing a method that returns the total size of the viewable window. In addition, this message will also manage handling the Scrolling messages sent by the window. An example of using this class is to create an object that is derived from CWindow and add code to derive from CSupportScrolling. The example provided below allows one to turn on scrolling for the dialog (in this case a Ski Report dialog in a Weather plugin):

```
:
class CDlgSkiReport :
    public CDialogImpl<CDlgSkiReport>,
    public CSupportScrolling,
:
```

The user then adds a handler for the WM_VSCROLL message and passes it to the base CSupportScrolling class.

```
LRESULT OnVScroll(UINT uMsg, WPARAM wParam, LPARAM lParam,
BOOL& bHandled)
{
    CSupportScrolling::OnVScroll(this, wParam, lParam);
    return 0;
}
```

Finally, the class implements a function called GetHeight( ) that will return the total height of the viewable area. With this information the base classes can manage all aspects of the scrolling. It should be appreciated that scrolling in windows for custom rendered applications is often a code intensive process. Many times it is implemented through cutting and pasting from one class into another. The present embodiment simplifies the process for the developer to add scrolling support to their class by generalizing this effort.

SupportScrollingList Helper Class

This class allows the developer to add support for a vertical scrolling list to their view class by simply deriving from CSupportScrollingList. CSupportScrollingList derives from CSupportScrolling and utilizes all of the functionality of that base class. In addition, it adds awareness to a variable number of items that is contained in the list and manages a selected item. The CSupportScrollingList helper class allows one to provide support for vertical scrolling (derived from CSupportScrolling above) as well as supporting the concept of a list. This is accomplished by a member variable in the CSupportScrollingList class that keeps track of the currently selected item. To provide support for a scrolling list of rendered items the user needs to derive from the CSupportScrollingList class. Here's an example from a 7 day forecast dialog in the weather plugin:

```
:
class CDlgForecast :
    public CDialogImpl<CDlgForecast>,
    public CSupportScrollingList,
    public CSupportRenderedUIList
:
```

The user will then need to ensure that all stylus events are passed to the base class. This allows the base class to determine if the selected item needs to change.

```
LRESULT OnLButtonDown(UINT uMsg, WPARAM wParam, LPARAM lParam,
    BOOL& bHandled)
{
    CSupportScrollingList::OnLButtonDown(this, wParam, lParam);
    return 0;
}
LRESULT OnLButtonUP(UINT uMsg, WPARAM wParam, LPARAM lParam,
BOOL& bHandled)
{
    CSupportScrollingList::OnLButtonUp(this, wParam, lParam);
    return 0;
}
```

The user typically should also provide implementations of two functions that will let the underlying base class determine the size of the viewable area. These functions are GetItemSize( ) and GetNumItems( ). It is often the responsibility of the user defined class to return the appropriate values. GetItemSize should return the size required to display a single item. GetNumItems should return the total number of items to display. Since by multiplying the results of these functions together gives one the total size it is not necessary to provide an implementation of GetHeight( ) as described in CSupportScrolling.

Finally, during the rendering of the screen the developer can determine what item is currently selected by querying the member variable m_ndxSelected. This will allow the rendering function to draw that item in the manner indicative of a selected item (e.g., as a yellow highlight).

SupportRenderedUI Class

This class allows the developer to provide support for a rendered image to their view class by simply deriving from CSupportRenderedUI. CSupportRenderedUI stores the viewable portion of the screen as a bitmap. The developer gets a significant benefit during scrolling of the item because it's only necessary to draw it once so scrolling can be achieved by simply drawing a different section of the bitmap image. To more fully explain this concept, in many implementations, the majority of screens provided on a wireless device 120 may be rendered rather than using standard controls. This provides the developer with pixel level control over the user interface. By avoiding standard controls the developer can make a richer interface to display the desired content. In known techniques, such a process results in a more difficult and time consuming development process. The present embodiment provides support classes to make it easier to have a custom rendered view by generalizing much of the necessary coding.

To utilize this helper class the user should derive from CSupportRenderedUI. It should be appreciated that this class is typically used in conjunction with CSupportScrolling unless the content is expected to only exist on a single page. Provided below is an example of a class that utilizes CSupportRenderedUI (the weather alerts dialog in the weather plugin):

```
class CDlgWeatherAlerts :
    public CDialogImpl<CDlgWeatherAlerts>,
    public CSupportScrolling,
    public CSupportRenderedUI
```

The CSupportRenderedUI class manages whether the image needs to be redrawn. This is only necessary if the consumer of this class determines it is necessary. The default implementation allows the user to render the bitmap once and if scrolling occurs it will draw from the previous bitmap of the view. This is particularly beneficial for drawing something that is image intensive and resource intensive as it only needs to be drawn once and can be scrolled around without inflicting the overhead of rendering a second time. This is accomplished with a Boolean variable in the base class that is used to maintain the necessity for a drawing operation. The consumer class can check this variable in the rendering method to determine if they need to re-render the image or just use the one that is there.

SupportRenderedUI List

This class allows the developer to provide support for a rendered image that represents a list of items by simply deriving from CSupportRenderedUIList. CSupportRenderedUIList derives from CSupportRenderedUI and utilizes all of the functionality of that base class. In addition it stores a selected version of the bitmap. For example, each concept in the list should have a graphical representation in two states, selected and unselected. The disclosed list supports the concept of one selected item which, when rendered, should be rendered from the selected bitmap image. Everything else is typically rendered from the unselected image. This is a specialized version of the CSupportRenderedUI class above. It adds the ability to support a list of items. It is often used in conjunction with CSupportScrollingList. It adds another bitmap to the consumer class that represents the selected item. Because the disclosed lists have selected items the visual aspect of the view can change if the user is moving around in the list even though the underlying content does not change. If the rendering process is resource intensive the interface can appear sluggish. This may be addressed by keeping two bitmaps that contain the view of everything selected and nothing selected. The rendering function can then cut and paste from the appropriate cached image to render the view. To provide support for a rendered list of items one simply derives from CSupportRenderedUIList as in the example below:

```
class CDlgForecast :
    public CDialogImpl<CDlgForecast>,
    public CSupportScrollingList,
    public CSupportRenderedUIList
```

Everything else works in a manner similar to CSupportRenderedUI except the rendering function needs to draw the selected bitmap as well as the non-selected bitmap.

SupportRendered Form

This class allows the developer to provide support for a custom rendered form (window with labels and data fields). This architecture allows for the developer to simply derive from the CSupportRenderedForm class, define some files and have the class manage the drawing and acquire user input. An exemplary screen definition is:

```
m_strTitle = L"Mapping";
m_fieldAddress.Initialize(typeEdit, L"Address:");
AddField(&m_fieldAddress);
m_fieldCity.Initialize(typeEdit, L"City:");
AddField(&m_fieldCity);
m_fieldState.Initialize(typeList, L"State:");
AddField(&m_fieldState);
```

-continued

```
m_fieldCountry.Initialize(typeList, L"Country:");
AddField(&m_fieldCountry);
m_fieldZip.Initialize(typeEdit, L"ZIP:");
AddField(&m_fieldZip);
```

One reason for this class is to get away from the "clunky" look of the WM controls. Using WM standard controls one can only display a few fields at a time on the screen. The present embodiment, in contrast, looks visually appealing on the screen and allows for similar functionality as the standard controls. This is addressed by rendering the form from a developer description (see code above) and letting the base class determine when something requires editing. Based on the type the appropriate control is displayed (typeEdit=edit control; typeList=drop down control). To provide support for a rendered form the developer should derive from this class (from the New Location dialog in the Weather plugin):

```
class CDlgNew :
    public CDialogImpl<CDlgNew>,
    public CSupportRenderedForm<CDlgNew>,
    public CSupportRenderedUI
```

This will allow the user to add code to describe the form as above. The user should then add a message handler for WM_PAINT and call RenderItems which is defined in the base class and will render the items as specified by the user.

```
LRESULT OnPaint(UINT uMsg, WPARAM wParam,
    LPARAM lParam,
BOOL& bHandled)
{
    RenderItems( );
    return 0;
}
WndUpdateChannels
```

WndUpdateChannels is a custom class that was developed to add support for drag/drop. This is a custom interface that allows the user to check items for inclusion or uncheck for exclusion from updates. In addition, if the user clicks and drags on an item they can manipulate the ordering of the update. Unlike the other classes above this class is not a utility used as building blocks for other user interface (UI) classes. Its primary function is to provide support for managing whether a plugin should be updated from "Update All" and the order in which it appears in the display in PageOne. One benefit of this embodiment is that this custom control allows the user to drag and drop the selected item.

Token Parser Class (useable in J2ME)

This class provides data reading from different input streams. Its generic nature enables a developer to use it to parse data coming from either a file or HTTP data transfer. Different read methods may require the data be converted to a native format as expected by the application (or plugin/channel). This can also be used to specify different delimiters and character encodings (e.g., ISO8859_1) to give a broad range of flexibility at a low level. This class has the ability to recognize embedded binary data (e.g., PNG images) along with text data allowing the developer to mix the two. See the exemplary code in Appendix A.

A summarized example below shows use of a CacheFileTool class and a HTTPProxyHelper Class. Both of these classes use methods inherited from the Token Parser Class. Using the movie plugin as an example, initially the plugin loads the movies data from the wireless device 120 using CacheFileTool. When movie details are requested by the user the 'helper' variable is connected via HTTP to a server at the data service provider 110 and the returned data is read in the same manner using this method loadMovieDetails(Movie movie). The two different data sources are read by movie object using Token Parser methods.

```
public class MoviesPlugin extends Plugin
{
    protected CacheFileTool m_moviesCache;
    public HttpProxyHelper helper;
    public Vector movies; // Movies for My THeater List
    public MoviesPlugin( )
    {
        m_moviesCache = new CacheFileTool( );
        loadFromCache( );
    }
    // Loading From The Device Record store using the Cache File
    Tool which is
derived from Token Parser
    private void loadFromCache( )
    {
        if (m_moviesCache.open(PageOneApp.MOVIES_STORE))
        {
                int count = m_moviesCache.readInt( );
                for (int i = 0; i < count; i++)
                {
                    movie = new Movie( );
                    movie.read(m_moviesCache, false, false);
                    if (movie.id.length( ) > 0)
                    {
                        movies.addElement(movie);
                    }
                }
        }
    }
    // Loading from HTTP using the HTTP Helper class which is
    derived from TOken
Parser
    public void loadMovieDetails(Movie movie) throws EOFException
    {
        if (!helper.Valid( ))
            return;
        helper.SkipToStart( );
        int count = helper.splitCountToken( );
        for (int j = 0; j < count; j++)
        {
            helper.NextToken( );
            movie.read(helper,true,true);
        }
    }
}
public final class Movie
{
        public String id;
        public String name;
        public String runtime;
        public void read(TokenParser file, boolean includeDetails,
        boolean fromServer )
throws EOFException
        {
            id = file.readString( );
            name = file.readString( );
            runtime = file.readString( );
            genre1 = file.readString( );
            genre2 = file.readString( );
            rating = file.readString( );
                        // Conditionally load extra data items if
                        this data comes from the
Server
            if( fromServer && includeDetails )
            {
                        hasDetails = true;
                        advisory = file.readString( );
                        url = file.readString( );
                        actor1 = file.readString( );
            }
        }
}
```

Cache File Tool Class Overview (Useable in WM and JTME)

This class can be derived from the Token Parser Class described above, and thus may inherit that functionality. In addition, this class provides a capability of reading and writing to file systems. By encapsulating generic read/write functions into this class the developer can port the resulting interface from WM to a J2ME environment. Data objects can then be coded using this class to use different file systems in essentially the same manner even though the underlying file systems may be very different. Exemplary code showing such functionality is provided below. See also the exemplary code in Appendix B.

```
J2ME code to write a movie object to a record store
    public void write(CacheFileTool file )
    {
    file.write(city);
    file.write(state);
    file.write(zip);
    file.write(movieName);
    file.write(theaterName);
    file.write(theaterSearchType);
    file.write(movieSearchType);
    }
Windows Mobile C++ Code:
    void CWEMovieSettings::Write( CacheFileTool &file )
    {
    file.Write( m_nMovieSearchType);
    file.Write( m_strMovieName);
    file.Write( m_bMovieDetails);
    file.Write( m_nTheaterSearchType);
    file.Write( m_strTheaterName);
    file.Write( m_strTheaterCity);
    file.Write( m_strTheaterState);
    file.Write( m_strTheaterZip);
    }
```

The foregoing description of various embodiments of the invention has been presented for purposes of illustration and description. It is not intended to be exhaustive or to limit the invention to the precise form disclosed, and modifications and variations are possible in light of the above teachings or may be acquired from practice of the invention. By way of example, any number of plugins/channels may be provided—those set forth in the description above are thus a few examples of contemplated plugins/channels. Other such plugins/channels are also contemplated, such as a plugin/channel to access selected corporate databases (e.g., CRM), which would allow some personnel (e.g., sales department) to get up to the minute data on a customer before a sales call without having to possess the data on the wireless device 120. Additional plugins/channels contemplated include investment management plugins/channels (e.g., stock tickers/updates), sports information, rental car information/reservation plugins/channels, and information forwarding plugins/channels (e.g., to forward a reservation to one's secretary or other interested party). Thus, the embodiments were chosen and described in order to explain the principles of the invention and its practical application to enable one skilled in the art to utilize the invention in various embodiments and with various modifications as are suited to the particular use contemplated.

APPENDIX A

```
package com.handmark.express.common;
import java.util.Vector;
import java.io.UnsupportedEncodingException;
import java.io.EOFException;
import net.rim.device.api.io.Base64InputStream;
import java.io.InputStream;
//#ifdef debug
import de.enough.polish.util.Debug;
//#endif
public class TokenParser {
    public int    readPos ;
    public boolean eof;
    public boolean error;
    private byte [ ] delimiter = {'~'};
    public byte[ ] data;
    public byte[ ] binaryData;
    public String token;
    public String strLastError = "";
    // TODO –119 should be 137
    public String encoding;
    public static final int[ ] PNGID = {-119, 80, 78, 71, 13, 10, 26, 10};
    class B64Data extends InputStream {
        //byte[ ] input;
        //int pos = 0;
        public B64Data( ){
        }
        public int read( )
        {
            char ch ;
            ch = (char) data[readPos];
            if( ch == '|' )
               return –1;
            readPos++;
            return ch;
        }
    };
    public TokenParser( ) {
        encoding = System.getProperty("microedition.encoding");
        if (encoding == null || encoding.equals(""))
        {
            //#ifdef debug.info
            Debug.debug("TokenParser:constructor - no encoding defined - using ISO8859_1");
            //#endif
            encoding = "ISO8859_1";
        }
        resetParser( );
    }
    public void resetParser( )
{
    data = null; // allows go to get rid of previous data
    binaryData = null;
    strLastError = "";
    token = "";
    eof = false;
    readPos = 0;
    error = false;
}
public void SetDelimiter(String strDelimiter) throws IllegalArgumentException
{
    if (strDelimiter == null || strDelimiter.length( ) == 0)
        throw new IllegalArgumentException(
             "Delimiter must be at least one character.");
    try
    {
        delimiter = strDelimiter.getBytes(encoding);
    }
    catch (UnsupportedEncodingException e)
    {
        strLastError = "Unable to process request (Unsupported Encoding)";
        //#ifdef debug
        Debug.debug("HttpProxyParser:SetDelimiter - unsupported encoding - " +
e.getMessage( ));
        //#endif
    }
}
// Returns the numeric part of a string formatted like "string-123"
public int splitCountToken( ) throws EOFException
{
    read( );
```

APPENDIX A-continued

```
        int pos = token.lastIndexOf('-'); // token-##
        if( pos < 0 )
            return 0;
        try
        {
            return Integer.parseInt(token.substring(pos+1));
        }
        catch (NumberFormatException e)
        {
            return 0;
        }
    }
    public void skipTokens(int num) throws EOFException
    {
        while (num--> 0)
            read( );
    }
    public String NextToken( ) throws EOFException
    {
        read( );
        return token;
    }
    public String readString( ) throws EOFException
    {
        read( );
        return token;
    }
    public int readInt( ) throws NumberFormatException, EOFException
    {
        read( );
        return Integer.parseInt(token);
    }
    public boolean readBoolean( ) throws EOFException
    {
        read( );
        if( "Yy1Tt".indexOf(token.charAt(0)) >= 0)
            return true;
        return false;
    }
    public Integer readInteger( ) throws NumberFormatException, EOFException
    {
        read( );
        return Integer.valueOf(token);
    }
    public long readLong( ) throws NumberFormatException, EOFException
    {
        read( );
        return Long.parseLong(token);
    }
    /**
     * Searchs for a PNG data based on standard chars for the PNG image
     * @param data byte array to search
     * @param idx starting index into array to start searching
     * @return true if PNG header data was found, false otherwise
     */
    private boolean validatePNG(byte [ ]data, int idx)
    {
        for (int ii = 0; ii < PNGID.length; ii++)
        {
            try
            {
                if (PNGID[ii] != data[idx + ii])
                    return false;
            }
            catch (IndexOutOfBoundsException e) // read past end of byte array
            {
                return false;
            }
        }
        return true;
    }
    public byte[ ] readImage( ) throws EOFException
    {
        if (isImage( ))
        {
            read( );
        }
        return binaryData;
    }
```

APPENDIX A-continued

```
public boolean isImage( )
{
    if (readPos + PNGID.length >= data.length || eof)
        return false;
    if (data[readPos] == PNGID[0] && validatePNG(data, readPos))
    {
        //System.out.println("***** FOUND PNG IMAGE # 1 start= "+start+" end= "+data.length);
        return true;
    }
    binaryData = null;
    return false;
}
public byte[ ] readBinary(int len ) throws OutOfMemoryError
{
    long fm = Runtime.getRuntime( ).freeMemory( );
    byte bdata[ ];
    if(fm > len)
    {
        bdata = new byte[len];
        System.arraycopy(data, readPos, bdata, 0, len);
    }
    else
        throw new OutOfMemoryError ("Not enough free memory to handle request.");
    readPos += len + delimiter.length;
    return bdata;
}
public byte[ ] readBinarychar(int len ) throws OutOfMemoryError
{
    long fm = Runtime.getRuntime( ).freeMemory( );
    if( fm > len)
    {
        Base64InputStream bdata = new Base64InputStream( new B64Data( )); //= new
byte[len];
        byte[ ] bbytes = new byte[len];
        try {
        bdata.read( bbytes );
    }
    catch(Exception ex )
    {
        while(readPos < data.length && data[readPos] != 'I' )
        {
            readPos++;
        }
        return null;
    }
        /*
        for(int i=0; i < len; i++ )
        {
            bdata[i] = (byte) data[readPos++];
        }
        */
        //System.arraycopy(data, readPos, binaryData, 0, len);
        readPos += delimiter.length;
        return bbytes;
    }
        else
            throw new OutOfMemoryError ("Not enough free memory to handle request.");
}
public boolean read( ) throws EOFException // Read Next Token
{
    token = "";
    if (eof)
        throw new EOFException("Eof reached in tokenParser.");
    if( isImage( ) )
    {
      if(readPos == 0 ) // assume all the data is an image
         binaryData = data; // no need to allocate another memory chunk for this
      else
      {
         binaryData = readBinary( data.length - readPos );
      }
      readPos = data.length + 1;
      eof = true;
      return true;
    }
    // Find the starting position of the next delimiter
    int nextpos = indexOf(readPos);
```

APPENDIX A-continued

```
            if (nextpos < 0) // next delimited is end of data
            {
                nextpos = data.length;
                //eof = true;
                //throw new EOFException("Eof reached in tokenParser.");
            }
            if (nextpos > readPos)
            {
                //token = new String(data, readPos, nextpos - readPos);
                StringBuffer cdata = new StringBuffer(nextpos - readPos);
                char ch;
                int ec;
                for(int j = readPos; j < nextpos;j++)
                {
                    ch = (char) data[j];
                    if( ch == 1) // extended character indicator
                    {
                        ch = (char) data[++j]; // high order byte
                        ec = ch * 256;
                        ch = (char) ec; //(int) ch * 256;
                        ch += (char) data[++j];
                    }
                    cdata.append(ch );
                }
                token = cdata.toString( );
            }
        readPos = nextpos + delimiter.length;
        if (readPos >= data.length)
        {
            eof = true;
        }
        return true;
    }
    /**
     * Works like String.indexOf but makes assumptions that delimeter is usually one byte
     * long, start is >= 0, data length is greater than 0. Also uses bytes instead of char/Strings.
     * @param data byte array to search
     * @param start index into array to start search
     * @return index into array if delimiter is found, -1 if it's not found
     */
    protected int indexOf(int start)
    {
        while (start < data.length)
        {
            if (data[start] == delimiter[0])
            {
                //System.out.println("return "+start);
                if (delimiter.length > 1) // first char matches
                {
                    int ii = start + 1;
                    int jj = 1;
                    while (ii < data.length &&
                        jj < delimiter.length &&
                        data[ii++] == delimiter[jj++]) // do rest of delim chars match?
                    {
                        //do nothing
                    }
                    if (jj == delimiter.length) // found match
                    {
                        //System.out. println("Found multi delim "+start);
                        return start;
                    }
                }
                else
                    return start;
            }
            start++;
        }
        //System.out. println("Found no more tokens");
        return -1; // no match found
    }
    // abstract public void rawRead( );
    public void SkipToStart( ) throws EOFException
    {
        readPos = 0;
        eof = false;
```

APPENDIX A-continued

```
            if( isImage( ) )
                return;
            while( ! eof )
            {
                read( );
                if( token.indexOf("start") >= 0 )
                {
                    return;
                }
            }
        }
    }
    public static Vector parseString(String str, String delimiter)
        {
            Vector v = new Vector( );
            int start = 0, end;
            while ((end = str.indexOf(delimiter, start)) != -1)
            {
                v.addElement(new String(str.substring(start,end)));
                start = end + delimiter.length( );
            }
            if (str.length( ) > start)
            {
                v.addElement(new String(str.substring(start)));
            }
            v.trimToSize( );
            return v;
        }
    }
```

APPENDIX B

```
package com.handmark.express.common;
import java.io.*;
import java.lang.System;
import javax.microedition.rms.*;
import net.rim.device.api.io.Base64OutputStream;
import net.rim.device.api.system.*;
//#ifdef debug
import de.enough.polish.util.Debug;
//#endif
public class CacheFileTool extends TokenParser
{
    public static final String PREFERENCES_STORE = "preferences";
    public static final String STOCK_STORE = "stock";
    public static final String STOCK_PREF_STORE = "stockpref";
    public static final String WEATHER_STORE ="weather";
    public static final String WEATHER_PREF_STORE ="weatherpref";
    public static final String ALERTS_STORE = "alerts";
    public static final String MOVIES_PREF_STORE = "moviespref";
    public static final String MOVIES_STORE = "movies";
    public static final String INFO_STORE = "info";
    public static final String INFO_PREF_STORE = "infopref";
    public static final String MAP_PREF_STORE = "mappref";
    public static final String NEWS_PREF_STORE = "newspref";
    public static final String NEWS_STORE = "news";
    public static final String SPORTS_PREF_STORE = "sportspref"; public String filename;
    public static final String SPORTS_STORE = "sports";
//    public int    writeTrigger;
//    public boolean writing;
    private RecordStore rs;
    private RecordEnumeration re;
    private StringBuffer writeStream;
    //private boolean bResultStore;
    //private int writeStreamSize = 0;
    public static final String RMS_FULL = "Unable to save result data. Please reduce the
number of results being stored and update again to store these results.";
    public int sizeAvailable;
    class B64Data extends OutputStream
    {
        public void write(int v )
        {
            writeStream.append( (char) v );
        }
    }
```

APPENDIX B-continued

```
    public CacheFileTool( )
    {
        SetDelimiter("|");
    }
    public void init( )
    {
        writeStream = new StringBuffer( );
        eof = false;
    }
    public void init(boolean bResultStore)
    {
        //this.bResultStore = bResultStore;
        //writeStream = new Vector(32, 128);
        writeStream = new StringBuffer( );
        //writeStreamSize = 0;
        eof = false;
    }
    public boolean saveClean( String fn ) throws RecordStoreFullException,
RecordStoreException
    {
        filename = fn;
        int[ ] ids = null;
        //if we don't have enough size to save changes - don't delete old data
        rs = RecordStore.openRecordStore(filename, true);
        //save 2K buffer - it is possible to save a recordstore that can't be reopened because of
space
        int totalAvailable = rs.getSizeAvailable( ) + rs.getSize( );
        rs.closeRecordStore( );
        if (totalAvailable < writeStream.length( ) + 2048)
            throw new RecordStoreFullException( );
        boolean trydelrec = false;
        boolean tryreplace = false;
        try {
            RecordStore.deleteRecordStore(filename );
        }
        catch (Exception ex) {
            //#ifdef debug
            Debug.debug( "cacheFileTool:saveClean( ) - delete: " + ex.getMessage( ), ex );
            //#endif
            trydelrec = true;
        }
        if( trydelrec )
        {
        try {
            rs = RecordStore.openRecordStore(filename, true);
            int nrec = rs.getNumRecords( );
            int id;
            ids = new int[nrec];
            int i = 0;
            do {
            re = rs.enumerateRecords(null, null, true);
            if (rehasNextElement( ))
            {
                id = renextRecordId( );
                rs.deleteRecord(id);
                ids[i++] = id;
                //readStream = new String(bytes, 0, bytes.length, "UTF-8");
            }
            else
            {
              break;
            }
            } while(true );
            rs.closeRecordStore( );
        }
        catch(Exception ex )
        {
            //#ifdef debug
            Debug.debug( "cacheFileTool:saveClean( ) - try delete rec: " + ex.getMessage( ), ex );
            //#endif
            tryreplace = true;
        }
        }
        if( tryreplace )
        {
            try {
                if( ids != null )
                {
                    saveAsRecord( ids[0] );
```

APPENDIX B-continued

```
                closeWithoutSave( );
                return true;
            }
        }
    }
    catch(Exception ex )
    {
    //#ifdef debug
            Debug.debug( "cacheFileTool:saveClean( ) - try replace rec: " + ex.getMessage( ), ex );
    //#endif
    }
}
/*catch (RecordStoreNotFoundException e )
{
    // don't care about this one
}
catch(RecordStore Exception e )
{
    // don't care about this one
}*/
try {
    rs = RecordStore.openRecordStore(filename, true);
}
/*catch(RecordStoreException e )
{
    // don't care about this one
    lastError = e.g etMessage( );
    error = true;
    return false;
}*/
    catch(Exception e )
    {
    //#ifdef debug.error
    Debug.debug( "cacheFileTool:create( ) - open: " + e.getMessage( ), e );
    //#endif
    strLastError = e.getMessage( );
    error = true;
    return false;
    }
    // Write data into an internal byte array
    //write Buffer = new ByteArrayOutputStream( );
    close( );
    return true;
}
public boolean open( String fn )
{
    eof = false;
    filename = fn;
    try {
        rs = RecordStore.openRecordStore(filename, true);
        sizeAvailable = rs.getSizeAvailable( ) + rs.getSize( );
    }
    catch (RecordStoreFullException rsfe)
    {//if we can't open it because we don't have space we might as well delete it
        try {
            //#ifdef debug.error
            Debug.debug("CacheFileTool:open - need to increase RMS buffer, unable to open existing store.");
            //#endif
            RecordStore.deleteRecordStore(filename);
            rs = RecordStore.open RecordStore(filename, true);
            sizeAvailable = rs.getSizeAvailable( ) + rs.getSize( );
        }
        catch (Exception e)
        {
            //#ifdef debug.error
            Debug.debug("CacheFileTool:open - Unable to open empty record store", e);
            //#endif
            return false;
        }
    }
    catch(Exception e )
    {
        //#ifdef debug
            Debug.debug( "cacheFileTool:open( )" + e.getMessage( ), e );
        //#endif
            strLastError = e.getMessage( );
```

APPENDIX B-continued

```
                error = true;
                return false;
        }
        rawRead( ); // Read the first record
        return true;
}
// this code is assuming that there is only one record i the record store
// and that this record is one big delimited UTF-8 String
public void rawRead( )
{
        try
        {
                re = rs.enumerateRecords(null, null, false);
                if (re.hasNextElement( ))
                {
                        data = re.nextRecord( ); // binary data
                        //readStream = new String(bytes, 0, bytes.length, "UTF-8");
                }
                else
                {
                        eof = true;
                }
        }
        catch (Exception e)
        {
                //#ifdef debug.error
                        Debug.debug( "cacheFileTool:rawRead( ): " + e.getMessage( ), e );
                //#endif
                strLastError = e.getMessage( );
                   error = true;
                   eof = true;
                   data = null;
                }
        }
        public void close( ) throws RecordStoreFullException, RecordStoreException
        {
                save( );
                closeWithoutSave( );
        }
        public void closeWithoutSave( )
        {
                if (rs != null)
                {
                        try
                        {
                                rs.closeRecordStore( );
                        }
                        catch (Exception e)
                        {
                                //#ifdef debug.error
                                        Debug.debug("cacheFileTool:close " + e.getMessage( ));
                                //#endif
                        }
                }
        }
        public boolean write( int v)
        {
                write(Integer.toString(v));
                return error;
        }
        public boolean write( byte bdata[ ] )
        {
                try {
                        if( writeStream == null) // rw added
                                init( );
                        if (bdata != null)
                        {
                                /*
                                for( int i= 0; i < bdata.length; i++ )
                                {
                                        //writeStream.append( (char ) bdata[i] );
                                }
                                */
                                Base64OutputStream b = new Base64OutputStream(new B64Data( ));
                                b.write( bdata );
```

APPENDIX B-continued

```
        }
            writeStream.append("|");
    }
    catch(Exception e )
    {
        //#ifdef debug.error
        Debug.debug( "cacheFileTool.write( ): " + e.getMessage( ), e );
        //#endif
        error = true;
        strLastError = e.getMessage( );
    }
    return error;
}
public boolean write (long v)
{
    write(Long.toString(v));
    return error;
}
public boolean write( boolean v)
{
    String str;
    if( v )
    {
        str = "Y";
    }
    else
    {
        str= "N";
    }
    write(str);
    return error;
}
public boolean write(String str)
{
    try {
        if( writeStream == null) // rw added
            init( );
        if (str != null)
            writeStream.append(str); //append(null) = adds the string 'null'
        writeStream.append("|");
    }
    catch(Exception e )
    {
        //#ifdef debug.error
        Debug.debug( "cacheFileTool.write( ): " + e.getMessage( ), e );
        //#endif
        error = true;
        strLastError = e.getMessage( );
    }
    return error;
}
// flush the bytes written to the record store
private void save( ) throws RecordStoreFullException, RecordStoreException
{
    if( writeStream == null || writeStream.length( ) <= 0 )
        return;
    byte[ ] bytes = null;
    try {
        bytes = writeStream.toString( ).getBytes(encoding); //out.toByteArray( );
    }
    catch( UnsupportedEncodingException e )
    {
        //#ifdef debug.error
        Debug.debug( "cacheFileTool.save( ) - encoding: " + encoding + "\n"+ e.getMessage( ), e
);
        //#endif
            strLastError e.getMessage( );
            error = true;
    }
    try {
        if( bytes != null )
        {
            rs.addRecord(bytes, 0, bytes.length);
        }
    }
    catch(RecordStoreNotOpenException e)
    {
//ifdef debug.error
Debug.debug( "cacheFileTool.save( ) - record store not open: " + e.getMessage( ));
```

APPENDIX B-continued

```
                //#endif
                strLastError = e.getMessage( );
                error = true;
                throw e;
            }
            catch(RecordStoreFullException rsfe)
            {
                //#ifdef debug.error
                Debug.debug("cacheFileTool:save( ) - need to increase RMS buffer size. Unable to
add record.");
                //#endif
                rs.closeRecordStore( );
                strLastError = rsfe.getMessage( );
                error = true;
                throw rsfe;
            }
        }
    //flush the bytes written to the record store
    private void saveAsRecord(int id) throws RecordStoreFullException, RecordStoreException
    {
        if( writeStream == null || writeStream.length( ) <= 0 )
            return;
        byte[ ] bytes = null;
        try {
            bytes = writeStream.toString( ).getBytes(encoding); //out.toByteArray( );
        }
        catch( UnsupportedEncodingException e )
        {
            //#ifdef debug.error
            Debug.debug( "cacheFileTool.save( ) - encoding: " + encoding + "\n"+ e.getMessage( ), e
);
            //#endif
            strLastError = e.getMessage( );
                error = true;
        }
        try {
            if( bytes != null )
            {
                rs.setRecord(id,bytes, 0, bytes.length);
            }
        }
        catch(RecordStoreNotOpen Exception e)
        {
            //#ifdef debug.error
            "cacheFileTool.save( ) - record store not open: " + e.getMessage( ));
            //#endif
            strLastError = e.getMessage( );
            error = true;
            throw e;
        }
        catch(RecordStoreFullException rsfe)
        {
            //#ifdef debug.error
            Debug.debug("cacheFileTool:save( ) - need to increase RMS buffer size. Unable to
add record.");
            //#endif
            rs.closeRecordStore( );
            strLastError = rsfe.getMessage( );
            error = true;
            throw rsfe;
        }
    }
    public void deleteResultStore(String resultStoreName)
    {
        try
        {
            RecordStore.deleteRecordStore(resultStoreName );
        }
        catch (Exception e)
        {
            // #ifdef debug.error
            Debug.debug("CacheFileTool:saveChannels - Delete Record Store: " +
resultStoreName + " " + e.getMessage( ));
            //#endif
        }
    }
    public int getAvailableCacheSpace(String fn)
    {
        int totalAvailable = 0;
```

APPENDIX B-continued

```
        try
        {
            rs = RecordStore.openRecordStore(fn, true);
            //save 2K buffer - it is possible to save a recordstore that can't be reopened because
of space
            totalAvailable = rs.getSizeAvailable( ) + rs.getSize( );
            rs.closeRecordStore( );
        }
        catch
        (Exception rsnfe)
        { }
        return totalAvailable;
    }
}
```

What is claimed is:

1. A method of exchanging data between software components on a portable device, comprising:

activating a first software component using the portable device;

communicating with a service provider to identify a first data type used by the first software component, the first data type corresponding to data that must be retrieved from a service provider, wherein identifying the first data type comprises:

providing a list of data types available for the first software component from the service provider; and selecting a subset of the list of data available for the first software component, wherein the first data type comprises selected data and excludes un-selected data;

identifying a second data type used by the first software component, the second data type corresponding to other data previously retrieved from the service provider by the portable device;

retrieving data corresponding to the first data type from a the service provider for the first software component at the portable device, retrieving the other data corresponding to the second data type from the portable device;

displaying on the portable device a return content result including data corresponding to an aggregation of both the first data type and the second data type;

identifying common data from at least one of at least a portion of the data retrieved from the service provider and at least another portion of the other data retrieved from the portable device, the common data being used by the first software component and a second software component;

receiving input designating the second software component to activate at the portable device;

initiating a call by the first software component to toad activate the second software component in response to the input;

activating the second software component; and exchanging the common data between the second software component and the first software component.

2. The method of claim 1 wherein at least a portion of the retrieved data is not the common data.

3. The method of claim 1 further comprising retrieving supplemental data from the service provider for the second software component.

4. The method of claim 1 wherein the portable device comprises a wireless device.

5. The method of claim 1 wherein the first software component and the second software component each comprise one of a different application and a different channel/plugin residing within an application.

6. The method of claim 1 further comprising displaying a list of software components that utilize the common data retrieved from the service provider for the first software component.

7. The method of claim 6 wherein the input selects the second software component from the list.

8. The method of claim 1 wherein the first data type comprises status/update information.

9. The method of claim 8 wherein the first data type comprises outdated status/update information, and wherein the second data type comprises current status/update information previously retrieved by the portable device.

10. The method of claim 1 wherein the second data type comprises application files.

11. The method of claim 1 wherein identifying the first data type and the second data type used by the first software component is performed by the service provider.

12. The method of claim 1 wherein identifying the first data type and the second data type used by the first software component is performed by the portable device.

13. The method of claim 1 further comprising storing data corresponding to the second data type on the portable device.

* * * * *